US012738199B2

(12) United States Patent
Lee et al.

(10) Patent No.: US 12,738,199 B2
(45) Date of Patent: Sep. 15, 2026

(54) DISPLAY DEVICE, METHOD OF DRIVING THE SAME, AND ELECTRONIC DEVICE

(71) Applicant: Samsung Display Co., LTD., Yongin-si (KR)

(72) Inventors: Seong Joo Lee, Yongin-si (KR); Oh Jo Kwon, Yongin-si (KR); Jae Sang Kim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/977,348

(22) Filed: Dec. 11, 2024

(65) Prior Publication Data

US 2025/0265972 A1 Aug. 21, 2025

(30) Foreign Application Priority Data

Feb. 19, 2024 (KR) ........................ 10-2024-0023552

(51) Int. Cl.
*G09G 3/32* (2016.01)
*G09G 3/3275* (2016.01)

(52) U.S. Cl.
CPC ............. *G09G 3/32* (2013.01); *G09G 3/3275* (2013.01); *G09G 2310/0275* (2013.01); *G09G 2310/0297* (2013.01); *G09G 2310/08* (2013.01)

(58) Field of Classification Search
None
See application file for complete search history.

(56) References Cited

U.S. PATENT DOCUMENTS

2005/0207249 A1* 9/2005 Morita .................. G11C 7/106
365/203
2023/0386376 A1* 11/2023 Kim ...................... G09G 3/006
2024/0087519 A1 3/2024 Kim et al.
2024/0265850 A1* 8/2024 Heo ........................ G09G 3/32

FOREIGN PATENT DOCUMENTS

KR 10-2087841 3/2020
KR 10-2022-0107797 8/2022

* cited by examiner

*Primary Examiner* — Christopher J Kohlman
(74) *Attorney, Agent, or Firm* — Innovation Counsel LLP

(57) ABSTRACT

A display device includes a data driver for supplying a reference voltage and a plurality of data signals to each of output lines, a divider including demultiplexers for supplying the reference voltage and the plurality of data signals, which are supplied from the each of the output lines, to a plurality of data lines, corresponding to control signals, a timing controller for supplying the control signals, and pixels connected to scan lines and the data lines. The pixels located on at least two different horizontal lines are simultaneously supplied with the reference voltage.

21 Claims, 23 Drawing Sheets

SL1: SL11, SL12, ..., SL1n
SL2: SL21, SL22, ..., SL2n
SL3: SL31, SL32, ..., SL3n
EL1: EL11, EL12, ..., EL1n
EL2: EL21, EL22, ..., EL2n

DISPLAY DEVICE, METHOD OF DRIVING THE SAME, AND ELECTRONIC DEVICE

CROSS-REFERENCE TO RELATED APPLICATION(S)

This application claims priority to and benefits of Korean patent application No. 10-2024-0023552 under 35 U.S.C. § 119(a), filed on Feb. 19, 2024, in the Korean Intellectual Property Office (KIPO), the entire contents of which are incorporated herein by reference.

BACKGROUND

1. Technical Field

The disclosure generally relates to a display device and a method of driving the same, and electronic device.

2. Description of the Related Art

With the development of information technologies, the importance of a display device which is a connection medium between a user and information increases. Accordingly, display devices such as a liquid crystal display device and an organic light emitting display device are increasingly used.

Recently, a Head Mounted Display Device (HMD) has been developed. The HMD is a display device which a user wears in the form of glasses or a helmet, thereby implementing Virtual Reality (VR) or Augmented Reality (AR), in which a focus is formed at a distance close to eyes.

SUMMARY

Embodiments provide a display device and a method of driving the same, which can be applied to high resolution.

In accordance with an embodiment of the disclosure, a display device may include a data driver that supplies a reference voltage and a plurality of data signals to each of output lines, a divider including demultiplexers that supplies the reference voltage and the plurality of data signals, which are supplied from the each of the output lines, to a plurality of data lines, corresponding to control signals, a timing controller that supplies the control signals, and pixels connected to scan lines and the plurality of data lines. The pixels located on at least two different horizontal lines may be simultaneously supplied with the reference voltage.

Each of the pixels may be divisionally driven in an initialization period, a threshold voltage compensation period, and a data writing period. The pixels may be supplied with the reference voltage during the initialization period and the threshold voltage compensation period.

The initialization period and the threshold voltage compensation period of the pixels located on the at least two different horizontal lines may overlap with each other.

The data writing period of the pixels located on the at least two different horizontal lines may not overlap with each other.

Each of the demultiplexers may include switches, each connected to one of the plurality of data lines and turned on or turned off corresponding to the control signals. The data driver may supply the reference voltage to the output lines during the initialization period and the threshold voltage compensation period. The timing controller may simultaneously supply the control signals such that the switches may be simultaneously turned on during the initialization period and the threshold voltage compensation period.

The data driver may sequentially supply the plurality of data signals to each of the output lines during the data writing period. The timing controller may sequentially supply the control signals such that the switches are sequentially turned on during the data writing period.

Each of the demultiplexers may be connected to the plurality of data lines, and each of the plurality of data lines may be connected to the pixels emitting lights of different colors.

Each of the demultiplexers may be connected to the plurality of data lines, and each of the plurality of data lines may be connected to the pixels emitting light of a same color.

The display device may further include a main line located between the timing controller and the divider, main buffers disposed at a side and another side of the main line, the main buffers supplying, to the main line, at least one of the control signals supplied from the timing controller, branch lines branching off from the main line, and a sub-buffer located on each of the branch lines, the sub-buffer being connected to at least one of the demultiplexers.

A channel of the data driver may include a first decoder that generates the plurality of data signals, a second decoder that generates the reference voltage, a first switch connected between a source amplifier and the first decoder, and a second switch connected between the source amplifier and the second decoder. An output terminal of the source amplifier may be connected to one of the output lines.

The first switch may be turned on during the data writing period, corresponding to a voltage control signal supplied from the timing controller. The second switch may be turned on during the initialization period and the threshold voltage compensation period, corresponding to the voltage control signal.

Each of the pixels may include: a first transistor including a gate electrode connected to a first node, a first electrode connected to a first power line, and a second electrode connected to a second node; a second transistor including a first electrode connected to one of the plurality of data lines and a gate electrode connected to a first scan line; a third transistor connected between the first node and the second node, the third transistor including a gate electrode connected to a second scan line; a light emitting element including an anode electrode and a cathode electrode, the cathode electrode connected to a second power line; a fourth transistor connected between the anode electrode of the light emitting element and the second node, the fourth transistor including a gate electrode connected to a first emission control line; a fifth transistor connected between the anode electrode of the light emitting element and a third power line, the fifth transistor including a gate electrode connected to a third scan line; a sixth transistor connected between the first electrode of the first transistor and the first power line, the sixth transistor including a gate electrode connected to a second emission control line, a first capacitor connected between a second electrode of the second transistor and the first node; and a second capacitor connected between the first power line and the first node.

In accordance with another embodiment of the disclosure, a method of driving a display device may include supplying a reference voltage and a plurality of data signals to an output line; supplying the reference voltage and the plurality of data signals to a plurality of data lines, using a demultiplexer connected to the output line; and supplying the reference voltage to pixels during a first period in which the pixels are initialized and a second period in which a threshold voltage of a driving transistor included in each of the pixels is compensated. The pixels located on at least two different horizontal lines may be simultaneously supplied with the reference voltage during the first period and the second period.

The demultiplexers may include a plurality of switches each connected to one of the plurality of data lines. The plurality of switches may be set to be in a turn-on state during the first period and the second period.

The pixels may be supplied with the plurality of data signals during a third period, and the third periods of the pixels located on the at least two different horizontal lines may not overlap with each other.

The plurality of switches may be sequentially turned on such that turn-on periods of the plurality of switches do not overlap with each other during the third period.

The method may further include supplying, to a main line, at least one control signal for controlling turning-on and turning-off of the plurality of switches via a main buffer located at each of a side and another side of the main line, and supplying the at least one control signal to the demultiplexer via a sub-buffer connected to a branch line branching off from the main line.

Each of the plurality of data lines connected to the demultiplexer may be connected to the pixels emitting lights of different colors.

Each of the plurality of data lines connected to the demultiplexer may be connected to the pixels emitting light of a same color.

The reference voltage and the plurality of data signal may be supplied to the output line via a same source amplifier.

In accordance with an embodiment of the disclosure, an electronic device may include a processor to provide input image data; and a display device to display an image based on the input image data. The display device may include: a data driver that supplies a reference voltage and a plurality of data signals to each of output lines; a divider including demultiplexers that supplies the reference voltage and the plurality of data signals, which are supplied from the each of the output lines, to a plurality of data lines, corresponding to control signals; a timing controller that supplies the control signals; and pixels connected to scan lines and the plurality of data lines. The pixels located on at least two different horizontal lines may be simultaneously supplied with the reference voltage.

BRIEF DESCRIPTION OF THE DRAWINGS

Embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF THE EMBODIMENTS

Figure 1:
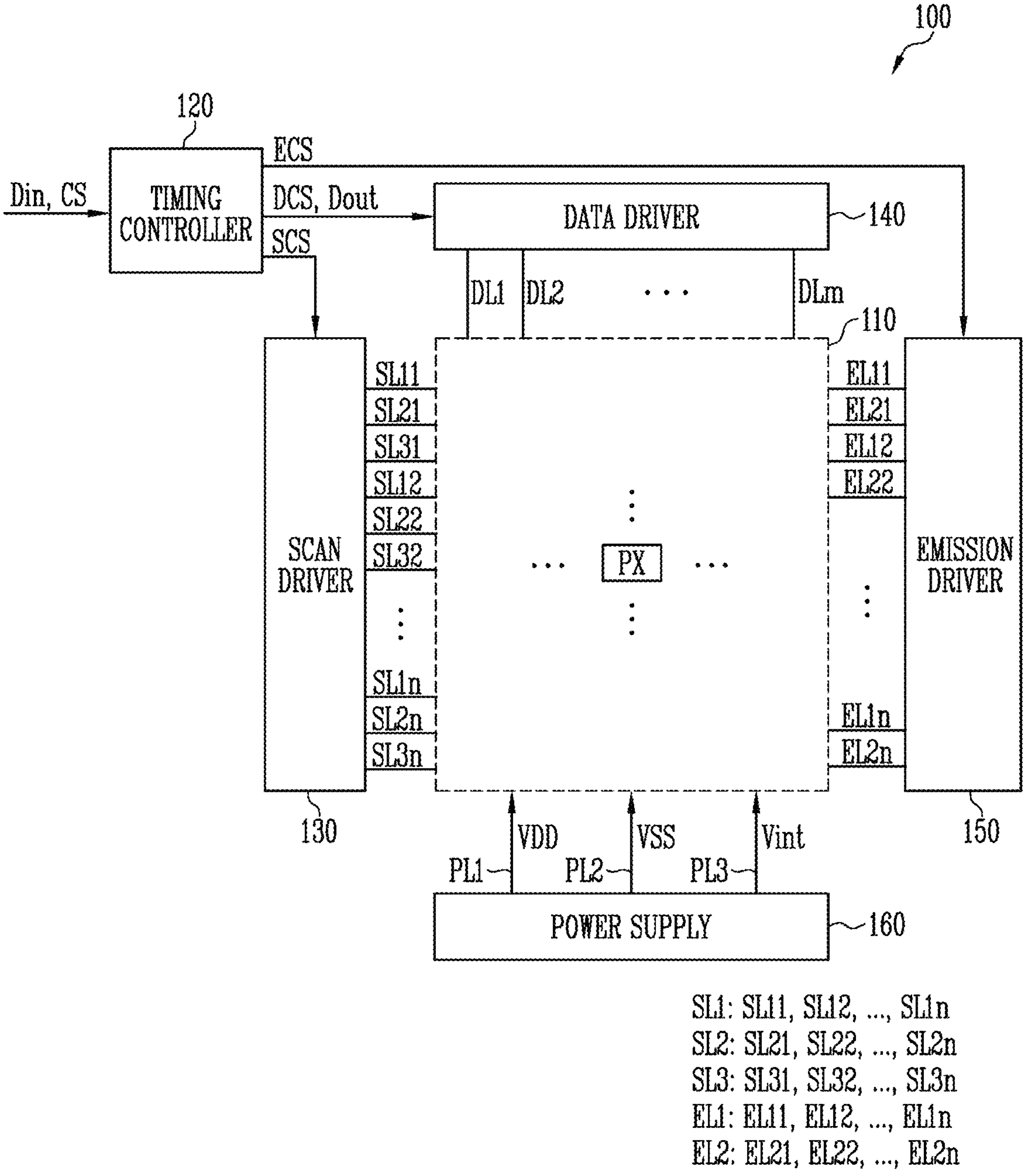
FIG. 1 is a schematic diagram illustrating a display device in accordance with an embodiment of the disclosure.

Hereinafter, embodiments are described in detail with reference to the accompanying drawings so that those skilled in the art may readily practice the disclosure. The disclosure may be implemented in various different forms and is not limited to the embodiments described in the specification.

A part irrelevant to the description will be omitted to clearly describe the disclosure, and the same or similar constituent elements will be designated by the same reference numerals throughout the specification. Therefore, the same reference numerals may be used in different drawings to identify the same or similar elements.

In description, the expression "equal" may mean "substantially equal." For example, this may mean equality to a degree to which those skilled in the art can understand the equality. Other expressions may be expressions in which "substantially" is omitted.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the disclosure. Also, in some embodiments, the blocks, the units, and/or the modules may be physically separated into more complex blocks, more complex units, and/or more complex modules without departing from the scope of the disclosure.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the disclosure.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the specification and the claims, the phrase "at least one of" is intended to include the meaning of "at least one selected from the group of" for the purpose of its meaning and interpretation. For example, "at least one of A and B" may be understood to mean "A, B, or A and B." In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

The disclosure is not limited to embodiments disclosed below, and may be implemented in various forms. Each embodiment disclosed below may be independently embodied or be combined with at least another embodiment prior to being embodied.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Figure 2:
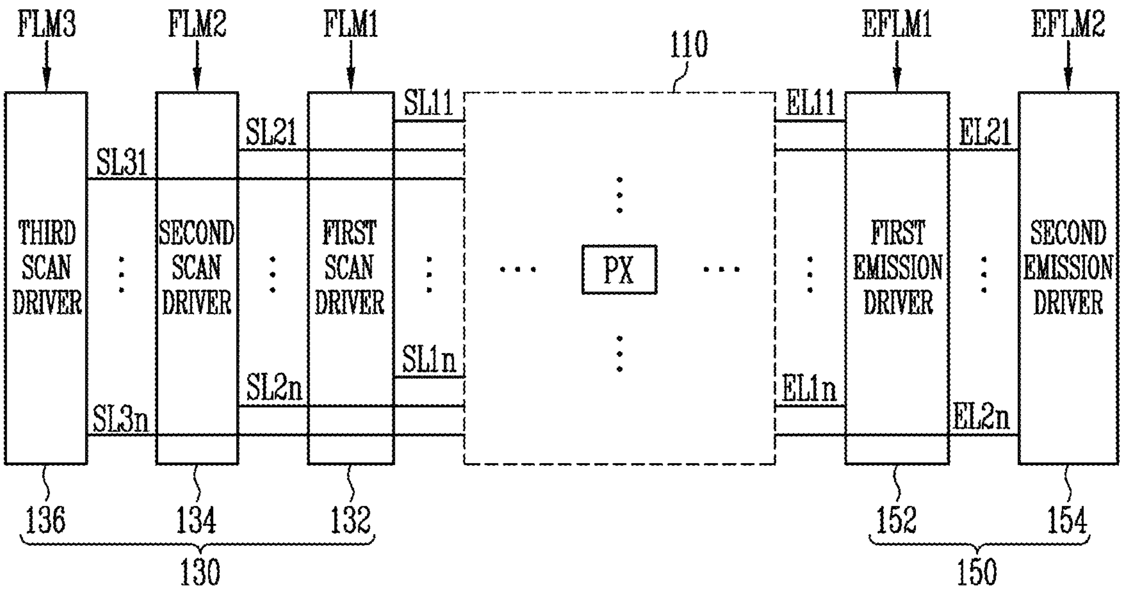
FIG. 2 is a schematic diagram illustrating an embodiment of a scan driver and an emission driver, which are shown in FIG. 1.

FIG. 1 is a schematic diagram illustrating a display device in accordance with an embodiment of the disclosure. FIG. 2 is a schematic diagram illustrating an embodiment of a scan driver and an emission driver, which are shown in FIG. 1.

Referring to FIGS. 1 and 2, the display device 100 in accordance with an embodiment of the disclosure may include a pixel unit 110 (or panel), a timing controller 120, a scan driver 130, a data driver 140, an emission driver 150, and a power supply 160. The above-described components may be implemented as separate integrated circuits, and two or more components among the above-described components may be implemented to be integrated into one integrated circuit.

The pixel unit 110 may include pixels PX connected to first scan lines SL11, SL12, . . . , and SL1$n$, second scan lines SL21, SL22, . . . , and SL2$n$, third scan lines SL31, SL32, . . . , and SL3$n$, data lines DL1, DL2, . . . , and DLm, first emission control lines EL11, EL12, . . . , and EL1$n$, second emission control lines EL21, EL22, . . . , and EL2$n$, and power lines PL1, PL2, and PL3 (n and m are natural numbers of 3 or more).

In an embodiment, a pixel PXij (see FIG. 3) located on an ith horizontal line (or pixel row) and a jth vertical line (or pixel column) may be connected to an ith first scan line SL1$i$, an ith second scan line SL2$i$, an ith third scan line SL3$i$, an ith first emission control line EL1$i$, an ith second emission control line EL2$i$, and a jth data line DLj (i is an integer of n or less, and j is an integer of m or less).

Pixels PX may be selected in units of horizontal lines (e.g., pixels PX connected to a same scan line may be sorted as one horizontal line (or pixel row)) in case that a first scan signal is supplied to the first scan lines SL11 to SL1$n$, and each of the pixels PX selected by the first scan signal may be supplied with a data signal from a data line (one of DL1 to DLm) connected to the pixel PX. The pixel PX supplied with a data signal may generate light with a luminance, corresponding to a voltage of the data signal.

The scan driver 130 may receive a scan driving signal SCS from the timing controller 120. At least one scan start signal and clock signals for driving of the scan driver 130 may be included in the scan driving signal SCS. The scan driver 130 may generate the first scan signal, a scan signal, and a third scan signal while shifting the scan start signal, corresponding to the clock signal.

To this end, the scan driver 130 may include a first scan driver 132, the second scan driver 134, and a third scan driver 136 as shown in FIG. 2.

The first scan driver 132 may receive a first scan start signal FLM1, and generate a first scan signal while shifting the first scan start signal FLM1, corresponding to the clock signal. The first scan driver 132 may sequentially supply the first scan signal to the first scan lines SL11 to SL1$n$.

The second scan driver 134 may receive a second scan start signal FLM2, and generate a second scan signal while shifting the second scan start signal FLM2, corresponding to the clock signal. The second scan driver 134 may sequentially supply the second scan signal to the second scan lines SL21 to SL2$n$.

The third scan driver 136 may receive a third scan start signal FLM3, and generate a third scan signal while shifting the third scan start signal FLM3, corresponding to the clock signal. The third scan driver 136 may sequentially supply the third scan signal to the third scan lines SL31 to SL3$n$. Each of the first scan signal, the second scan signal, and the third scan signal may be set to a gate-on voltage such that transistors included in the pixels PX can be turned on.

In an embodiment, the first scan signal, the second scan signal, and the third scan signal, which have a low level, may be supplied to a P-type transistor, and the first scan signal, the second scan signal, and the third scan signal, which have a high level, may be supplied to an N-type transistor. A transistor supplied with the first scan signal, the second scan signal, or the third scan signal may be turned on corresponding to the first scan signal, the second scan signal, or the third scan signal. That the first scan signal, the second scan signal, or the third scan signal is supplied may mean that the gate-on voltage is supplied to a first scan line SL1, a second scan line SL2, or a third scan line SL3. That the first scan signal, the second scan signal, or the third scan signal is not supplied may mean that a gate-off voltage is supplied to the first scan line SL1, the second scan line SL2, or the third scan line SL3.

In FIG. 2, it is illustrated that the first scan driver 132, the second scan driver 134, and the third scan driver 136 are connected to the first scan line SL1, the second scan line SL2, and the third scan line SL3, respectively. However, the disclosure is not limited thereto. In another embodiment, at least two scan lines (at least two of SL1, SL2, and SL3) among the first scan line SL1, the second scan line SL2, and the third scan line SL3 may be driven by one scan driver.

The data driver 140 may receive output data Dout and a data driving signal DCS from the timing controller 120. The data driving signal DCS may include a sampling signal and/or timing signals for driving of the data driver 140. The data driver 140 may generate a data signal, based on the data driving signal DCS and the output data Dout. In an embodiment, the data driver 140 may generate an analog data signal, based on a grayscale of the output data Dout. The data driver 140 may sequentially supply a voltage (or reference voltage) of a reference power source Vref (see FIG. 4) and a voltage Vdata (see FIG. 4) of the data signal to the data lines DL1 to DLm during one horizontal period 1H (see FIG. 4). The reference power source Vref may be set to a constant voltage.

The emission driver 150 may receive an emission driving signal ECS from the timing controller 120. An emission start signal and clock signals for driving the emission driver 150 may be included in the emission driving signal ECS. The emission driver 150 may generate a first emission control signal and a second emission control signal while shifting the emission start signal, corresponding to the clock signal.

To this end, the emission driver 150 may include a first emission driver 152 and a second emission driver 154 as shown in FIG. 2.

The first emission driver 152 may receive a first emission start signal EFLM1, and generate a first emission control signal while shifting the first emission start signal EFLM1, corresponding to the clock signal. The first emission driver 152 may sequentially supply the first emission control signal to the first emission control lines EL11 to EL1*n*.

The second emission driver 154 may receive a second emission start signal EFLM2, and generate a second emission control signal while shifting the second emission start signal EFLM2, corresponding to the clock signal. The second emission driver 154 may sequentially supply the second emission control signal to the second emission control lines EL21 to EL2*n*. The first emission control signal and the second emission control signal may be set to the gate-off voltage such that the transistors included in the pixels PX can be turned off.

In an embodiment, the first emission control signal having the high level and the second emission control signal having the high level may be supplied to the P-type transistor, and the first emission control signal having the low level and the second emission control signal having the low level may be supplied to the N-type transistor. A transistor supplied with the first emission control signal or the second emission control signal may be turned off corresponding to the first emission control signal or the second emission control signal. That the first emission control signal or the second emission control signal is supplied may mean that the gate-off voltage is supplied to a first emission control line EL1 or a second emission control line EL2. That the first emission control signal or the second emission control signal is not supplied may mean that the gate-on voltage is supplied to the first emission control signal or the second emission control signal.

In FIG. 2, it is illustrated that the first emission driver 152 and the second emission driver 154 are connected to the first emission control line EL1 and the second emission control line EL2, respectively. However, the disclosure is not limited thereto. In another embodiment, the first emission control line EL1 and the second emission control line EL2 may be driven by one emission driver.

The timing controller 120 may receive input data Din and a control signal CS from a host system through an interface. In an embodiment, the timing controller 120 may receive the input data Din and the control signal CS from at least one of a Graphics Processing Unit (GPU), a Central Processing Unit (CPU), and an Application Processor (AP), which are included in the host system. Various signals including a clock signal may be included in the control signal CS.

The timing controller 120 may generate the scan driving signal SCS, the data driving signal DCS, and the emission driving signal ECS, based on the control signal CS. The scan driving signal SCS, the data driving signal DCS, and the emission driving signal ECS may be supplied to the scan driver 130, the data driver 140, and the emission driver 150, respectively.

The timing controller 120 may realign the input data Din to be suitable for specifications of the display device 100. Also, the timing controller 120 may generate the output data Dout by correcting the input data Din, and supply the output data Dout to the data driver 140. In an embodiment, the timing controller 120 may correct the input data Din, corresponding to an optical measurement result measured in a processing process.

The power supply 160 may generate various power sources for driving of the display device 100. In an embodiment, the power supply 160 may generate a first driving power source VDD, a second driving power source VSS, and an initialization power source Vint.

The first driving power source VDD may be a power source which supplies a driving current to the pixels PX. The second driving power source VSS may be a power source which is supplied with the driving current from the pixels PX. The first driving power source VDD may be set to a voltage higher than a voltage of the second driving power source VSS during a period in which the pixels PX are set to be in an emission state.

The initialization power source Vint may be a voltage for initializing a first electrode (or anode electrode) of a light emitting element LD (see FIG. 3) included in each of the pixels PX. The initialization power source Vint may have a voltage value at which the light emitting element LD is turned off in case that the initialization power source Vint is supplied to the first electrode of the light emitting element LD.

The first driving power source VDD generated by the power supply 160 may be supplied to a first power line PL1, the second driving power source VSS generated by the power supply 160 may be supplied to a second power line PL2, and the initialization power source Vint may be supplied to a third power line PL3. The first power line PL1, the second power line PL2, and the third power line PL3 may be commonly connected to the pixels PX, but the disclosure is not limited thereto.

In an embodiment, the first power line PL1 may be configured with multiple power lines, and the power lines may be connected to different pixels PX. In an embodiment, the second power line PL2 may be configured with multiple power lines, and the power lines may be connected to different pixels PX. In an embodiment, the third power line PL3 may be configured with multiple power lines, and the power lines may be connected to different pixels PX. In an embodiment of the disclosure, each of the pixels PX may be connected to one of the power lines of the first power line PL1, one of the power lines of the second power line PL2, and one of the power lines of the third power line PL3.

Figure 3:
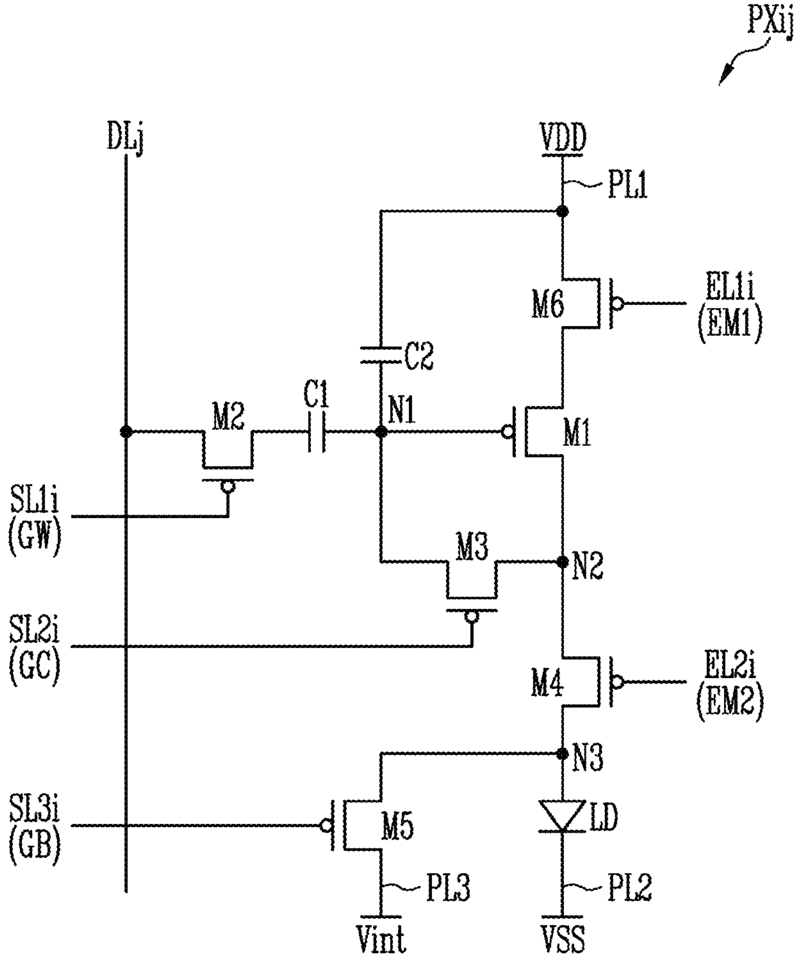
FIG. 3 is a schematic diagram illustrating an embodiment of an equivalent circuit of a pixel shown in FIG. 1.

FIG. 3 is a schematic diagram illustrating an embodiment of an equivalent circuit of the pixel shown in FIG. 1. In FIG. 3, a pixel PXij located on an ith horizontal line and a jth vertical line will be illustrated.

Referring to FIG. 3, the pixel PXij in accordance with an embodiment of the disclosure may be connected to corresponding signal lines SL1*i*, SL2*i*, SL3*i*, EL1*i*, EL2*i*, and DLj. For example, the pixel PXij may be connected to an ith first scan line SL1*i*, an ith second scan line SL2*i*, an ith third scan line SL3*i*, an ith first emission control EL1*i*, an ith second emission control line EL2*i*, and a jth data line DLj. In an embodiment, the pixel PXij may be further connected to the first power line PL1, the second power line PL2, and the third power line PL3.

The pixel PXij in accordance with an embodiment of the disclosure may include a light emitting element LD and a pixel circuit for controlling an amount of current supplied to the light emitting element LD.

The light emitting element LD may be connected between the first power line PL1 and the second power line PL2. In an embodiment, a first electrode (or anode electrode) of the light emitting element LD may be electrically connected to the first power line PL1 via a third node N3, a fourth transistor M4, a second node N2, a first transistor M1, and a sixth transistor M6, and a second electrode (or cathode electrode) of the light emitting element LD may be electrically connected to the second power line PL2. The light emitting element LD may generate light with a luminance, corresponding to an amount of current supplied from the first power line PL1 to the second power line PL2 via the pixel circuit.

The light emitting element LD may be an organic light emitting diode. In another embodiment, the light emitting element LD may be an inorganic light emitting diode such as a micro LED (light emitting diode) or a quantum dot light emitting diode. In another embodiment, the light emitting element LD may be an element configured with a combination of an organic material and an inorganic material. In FIG. 3, it is illustrated that the pixel PXij includes a single light emitting element LD. However, the disclosure is not limited thereto, and in another embodiment, the pixel PXij may include multiple light emitting elements LD, and the light emitting elements LD may be connected in series, parallel, or series/parallel to each other.

The pixel circuit may include the first transistor M1, a second transistor M2, a third transistor M3, the fourth transistor M4, a fifth transistor M5, the sixth transistor M6, a first capacitor C1, and a second capacitor C2.

In an embodiment, the transistors M1 to M6 may be formed with various types of transistors. In an embodiment, the transistors M1 to M6 may be formed with a Thin Film Transistor (TFT), a Field Effect Transistor (FET), a Bipolar Junction Transistor (BJT), and the like.

In an embodiment, the first to sixth transistors M1 to M6 may be formed with a P-type transistor. However, the disclosure is not limited thereto, and in another embodiment, at least one of the first to sixth transistors M1 to M6 may be replaced with an N-type transistor.

A first electrode of the first transistor M1 may be connected to a second electrode of the sixth transistor M6, and a second electrode of the first transistor M1 may be connected to the second node N2. The term "being connected" includes a meaning of being electrically connected. A gate electrode of the first transistor M1 may be connected to a first node N1. The first transistor M1 may control an amount of current supplied from the first driving power source VDD to the second driving power source VSS via the light emitting element LD, corresponding to a voltage of the first node N1.

The second transistor M2 may be connected between the data line DLj and a first electrode of the first capacitor C1. A gate electrode of the second transistor M2 may be electrically connected to the first scan line SL1*i*. The second transistor M2 may be turned on in case that a first scan signal GW is supplied to the first scan line SL1*i*, to electrically connect the data line DLj and the first electrode of the first capacitor C1 to each other.

The third transistor M3 may be connected between the first node N1 and the second node N2. A gate electrode of the third transistor M3 may be electrically connected to the second scan line SL2*i*. The third transistor M3 may be turned on in case that a second scan signal GC is supplied to the second scan line SL2*i*, to electrically connect the first node N1 and the second node N2 to each other. The gate electrode of the first transistor M1 (i.e., the first node N1) and the second electrode of the first transistor M1 (i.e., the second node N2) may be electrically connected to each other, and accordingly, the first transistor M1 may be diode-connected.

The fourth transistor M4 may be connected between the second node N2 and the third node N3 (i.e., a first electrode of the light emitting element LD). A gate electrode of the fourth transistor M4 may be electrically connected to the second emission control line EL2*i*. The fourth transistor M4 may be turned off in case that a second emission control signal EM2 is supplied to the second emission control line EL2*i*, and be turned on in case that the second emission control signal EM2 is not supplied. In case that the fourth transistor M4 is turned off, the first transistor M1 and the light emitting element LD may be electrically blocked from each other.

A first electrode of the fifth transistor M5 may be connected to the third node N3, and a second electrode of the fifth transistor M5 may be electrically connected to the third power line PL3. A gate electrode of the fifth transistor M5 may be electrically connected to the third scan line SL3*i*. The fifth transistor M5 may be turned on in case that a third scan signal GB is supplied to the third scan line SL3*i*. In case that the fifth transistor M5 is turned on, the voltage of the initialization power source Vint may be supplied to the third node N3.

A first electrode of the sixth transistor M6 may be electrically connected to the first power line PL1, and the second electrode of the sixth transistor M6 may be connected to the first electrode of the first transistor M1. A gate electrode of the sixth transistor M6 may be electrically connected to the first emission control line EL1*i*. The sixth transistor M6 may be turned off in case that a first emission control signal EM1 is supplied to the first emission control line EL1*i*, and be turned on in case that the first emission control signal EM1 is not supplied. In case that the sixth transistor M6 is turned off, the first power line PL1 and the first transistor M1 may be electrically blocked from each other.

The first electrode of the first capacitor C1 may be connected to the second electrode of the second transistor M2, and a second electrode of the first capacitor C1 may be connected to the first node N1. The first capacitor C1 may change the voltage of the first node N1, corresponding to a voltage supplied from the second transistor M2. In an embodiment, the first capacitor C1 may be driven as a coupling capacitor.

A first electrode of the second capacitor C2 may be electrically connected to the first power line PL1, and a second electrode of the second capacitor C2 may be connected to the first node N1. For example, the second capacitor C2 may be connected between the first power line PL1 and the first node N1. The second capacitor C2 may store the voltage of the first node N1.

Figure 4:
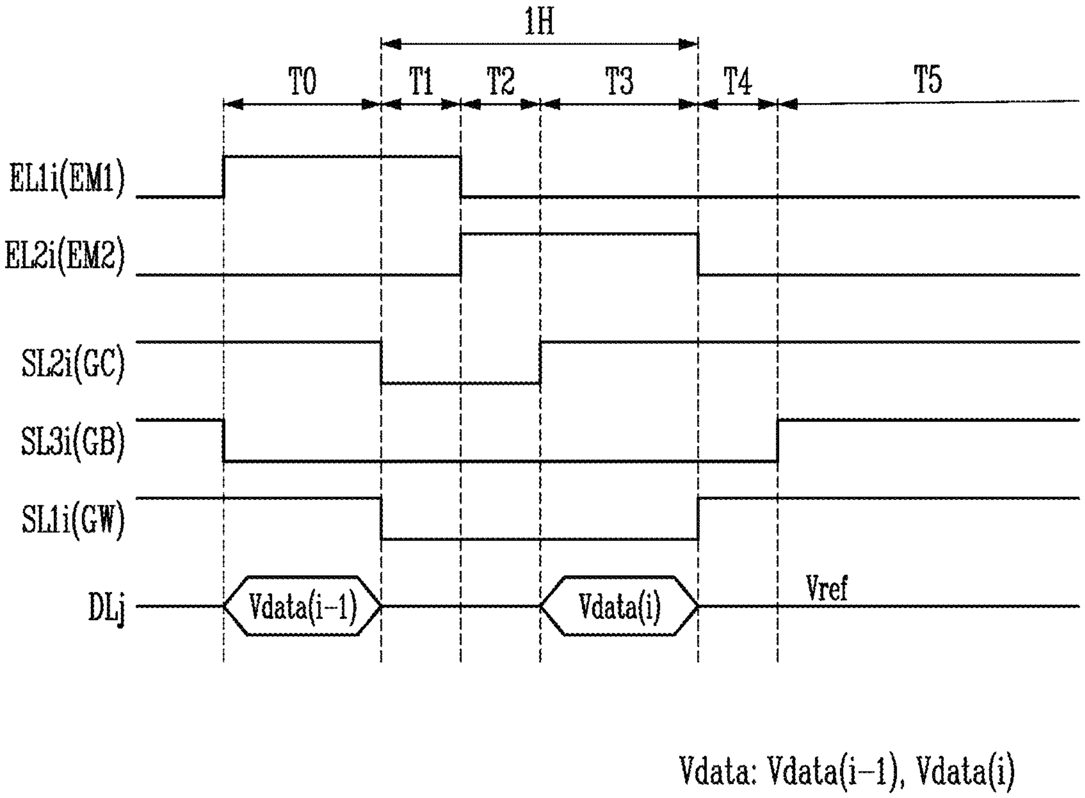
FIG. 4 is a schematic waveform diagram illustrating an embodiment of a method of driving the pixel shown in FIG. 3.

FIG. 4 is a schematic waveform diagram illustrating an embodiment of a method of driving the pixel shown in FIG. 3.

Referring to FIG. 4, a horizontal period 1H (or specific horizontal period) in which a data signal is supplied to the pixel PXij located on the ith horizontal line and the jth vertical line may be divided into a first period T1, a second period T2, and a third period T3. The horizontal period 1H may additionally include a fourth period T4.

The data driver 140 may supply a voltage of the reference power source Vref to the data line DLj during the first period T1 and the second period T2, and supply a voltage Vdata(i) of the data signal during the third period T3. The reference power source Vref may be set to a voltage between the first driving power source VDD and the second driving power VSS, e.g., a specific voltage within a voltage range of the data signal. The voltage Vdata(i) of the data signal may be set as a voltage within the voltage range of the data signal, corresponding to a grayscale.

The scan driver 130 (or the first scan driver 132) may supply the first scan signal GW to the first scan line SL1*i* during the first period T1 to the third period T3.

The scan driver 130 (or the second scan driver 134) may supply the second scan signal GC to the second scan line SL2*i* during the first period T1 and the second period T2.

The scan driver 130 (or the third scan driver 136) may supply the third scan signal GB to the third scan line SL3*i* during a zeroth period TO before the first period T1 to the fourth period T4 after the third period T3. The zeroth period TP may be a period included in a previous horizontal period (e.g., a period in which a data signal is supplied to pixels located on an (i−1)th horizontal line). The fourth period T4 may be a period included in a next horizontal period (e.g., a period in which a data signal is supplied to pixels located on an (i+1)th horizontal line).

The emission driver 150 (or the first emission driver 152) may supply the first emission control signal EM1 to the first emission control line EL1*i* during the zeroth period TO and the first period T1.

The emission driver 150 (or the second emission driver 154) may supply the second emission control signal EM2 to the second emission control line EL2*i* during the second period T2 and the third period T3.

The zeroth period TO may be a period in which the voltage of the initialization power source Vint is supplied to the third node N3 and the second node N2. During the zeroth period TO, the first electrode of the light emitting element LD may be initialized by the voltage of the initialization power source Vint. The zeroth period TO may be referred to as a first initialization period.

The first period T1 may be a period in which the voltage of the initialization power source Vint is supplied to the first node N1, the second node N2, and the third node N3 and the voltage of the reference power source Vref is supplied to the first electrode of the first capacitor C1. During the first period T1, the first capacitor C1 may be initialized by the voltage of the reference power source Vref and the voltage of the initialization power source Vint. The first period T1 may be referred to as a second initialization period (or initialization period).

The second period T2 may be a period in which a voltage corresponding to a threshold voltage of the first transistor M1 is stored in the second capacitor C2. The second period T2 may be referred to as a threshold voltage compensation period.

The third period T3 may be a period in which the voltage Vdata(i) of the data signal is supplied to the pixel PXij from the data line DLj. During the third period T3, a voltage corresponding to the data signal may be applied to the first node N1. The third period T3 may be referred to as a data writing period.

During the fourth period T4, the first transistor M1 may control an amount of current supplied from the first driving power source VDD to the initialization power source Vint, corresponding to the voltage of the first node N1. An unnecessary current may be prevented from being supplied to the light emitting element LD after the third period T3. The fourth period T4 may be referred to as a luminance control period.

During a fifth period T5, the first transistor M1 may control an amount of current flowing from the first driving power source VDD to the second driving power source VSS via the light emitting element LD, corresponding to the voltage of the first node N1. During the fifth period T5, the light emitting element LD may emit light with a luminance corresponding to the amount of current. The fifth period T5 may be referred to as an emission period.

FIGS. 5A to 5F are schematic diagrams illustrating an operation process of the pixel, which corresponds to driving waveforms shown in FIG. 4.

Figure 5A:
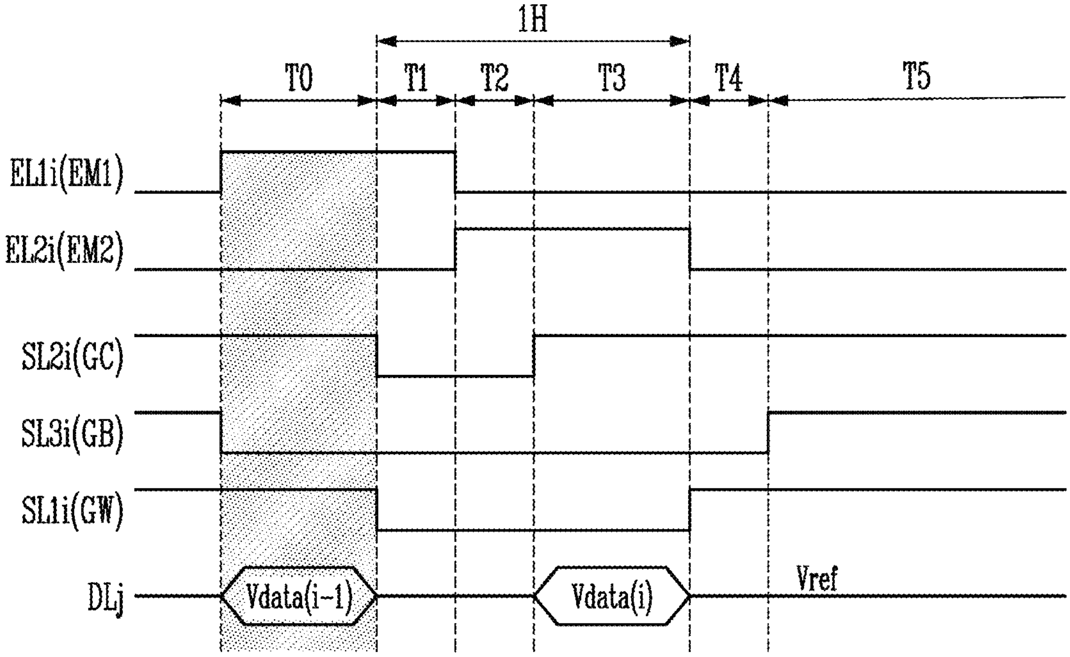
FIGS. 5A to 5F are schematic diagrams illustrating an operation process of the pixel, which corresponds to driving waveforms shown in FIG. 4.
Figure 5A:
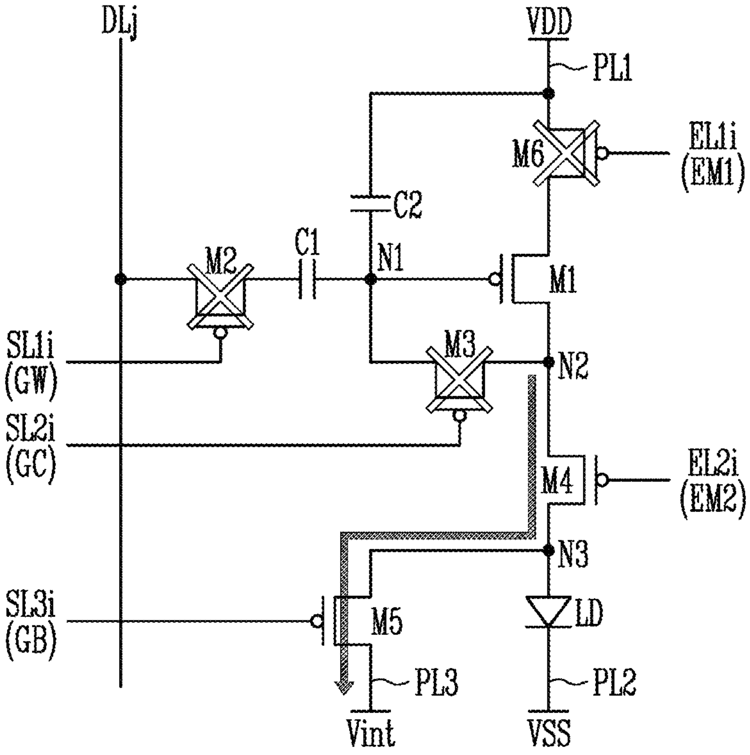

Referring to FIG. 5A, during the zeroth period TO, the first emission control signal EM1 may be supplied to the first emission control line EL1*i*, and accordingly, the sixth transistor M6 may be turned off.

During the zeroth period TO, the third scan signal GB may be supplied to the third scan line SL3*i*, and accordingly, the fifth transistor M5 may be turned on. In case that the fifth transistor M5 is turned on, the voltage of the initialization power source Vint may be supplied to the third node N3 and the second node N2.

In case that the voltage of the initialization power source Vint is supplied to the third node N3, the first electrode of the light emitting element LD may be initialized by the voltage of the initialization power source Vint. The initialization power source Vint may be set to a voltage at which the light emitting element LD does not emit light, and accordingly, the light emitting element LD may be set to be in a non-emission state. In an embodiment, a voltage value obtained by subtracting the second driving power source VSS from a voltage obtained by adding an absolute threshold voltage of the fifth transistor M5 to the voltage of the initialization power source Vint may be set to a voltage lower than a threshold voltage of the light emitting element LD.

During the zeroth period TO, the second transistor M2 may be set to be in a turn-off state, and accordingly, a voltage Vdata(i−1) of a data signal corresponding to a previous horizontal line may not be supplied to the pixel PXij.

Figure 5B:
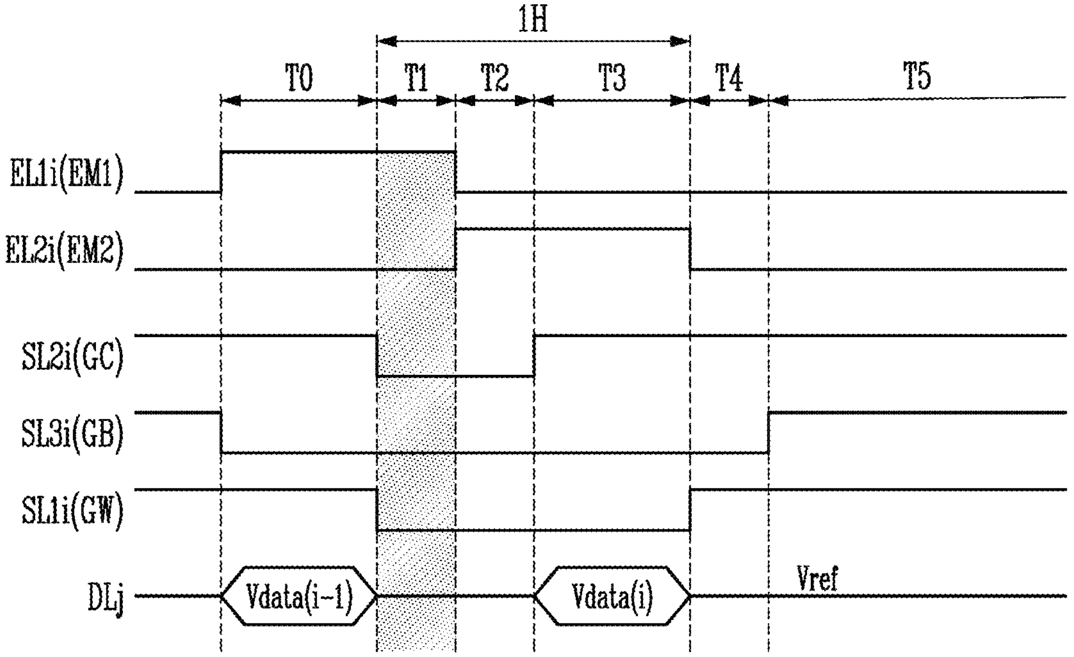
Figure 5B:
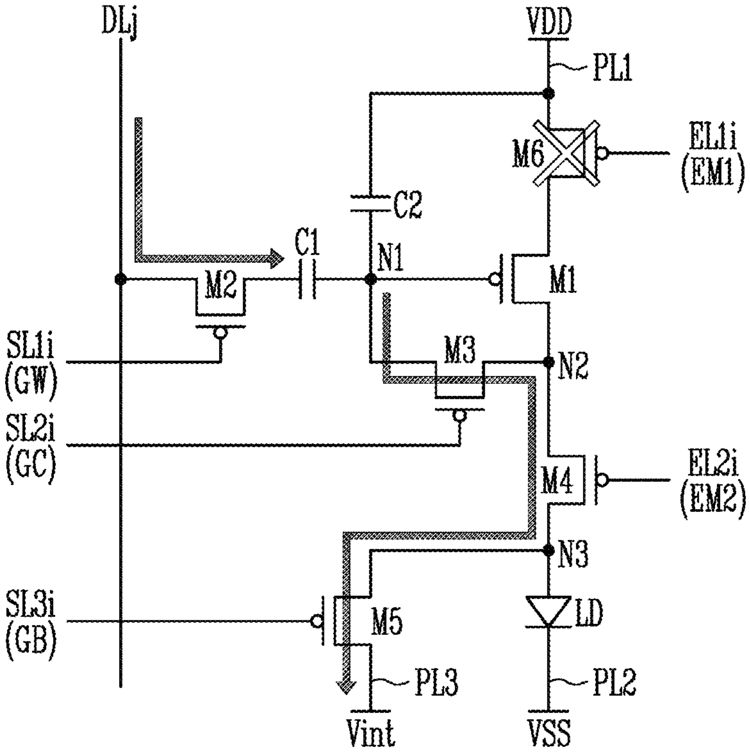

Referring to FIG. 5B, during the first period T1, the first emission control signal EM1 may be supplied to the first emission control line EL1*i*, and accordingly, the sixth transistor M6 may maintain the turn-off state.

During the first period T1, the first scan signal GW may be supplied to the first scan line SL1*i*, the second scan signal GC may be supplied to the second scan line SL2*i*, and the third scan signal GB may be supplied to the third scan line SL3*i*.

In case that the first scan signal GW is supplied to the first scan line SL1*i*, the second transistor M2 may be turned on. In case that the second transistor M2 is turned on, the data line DLj and the first electrode of the first capacitor C1 may be electrically connected to each other.

In case that the second scan signal GC is supplied to the second scan line SL2*i*, the third transistor M3 may be turned on. In case that the third transistor M3 is turned on, the first node N1 and the second node N2 may be electrically connected to each other.

In case that the third scan signal GB is supplied to the third scan line SL3*i*, the fifth transistor M5 may be turned on. In case that the fifth transistor M5 is turned on, the third power line PL3 and the third node N3 may be electrically connected to each other.

During the first period T1, the voltage of the reference power source Vref may be supplied to the first electrode of the first capacitor C1, and the voltage of the initialization power source Vint may be supplied to the first node N1. The first capacitor C1 may be initialized by the reference power source Vref and the initialization power source Vint regardless of a voltage supplied in a previous period (or previous frame period). Similarly, the second capacitor C2 may be initialized by the initialization power source Vint and the first driving power source VDD regardless of the voltage supplied in the previous period (or previous frame period).

The voltage of the initialization power source Vint (or the voltage obtained by adding the absolute threshold voltage of the fifth transistor M5 to the initialization power source Vint), which is applied to the first node N1, may be set as a voltage lower than the voltage of the first driving power source VDD. In an embodiment, the voltage of the initialization power source Vint may be set as a voltage at which the first transistor M1 can be turned on in case that the voltage of the first driving power source VDD is applied to the first electrode of the first transistor M1.

Figure 5C:
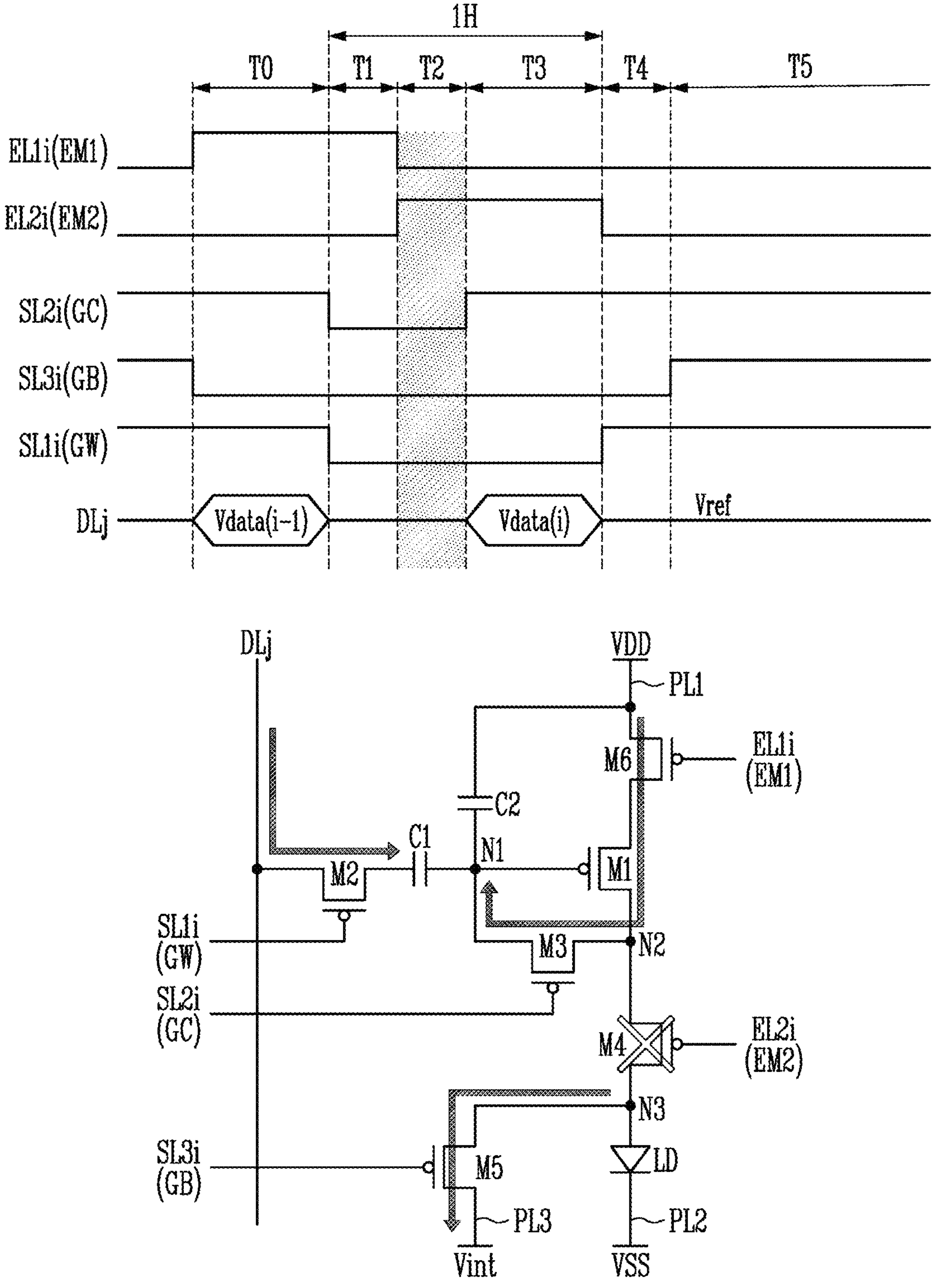

Referring to FIG. 5C, during the second period T2, the second emission control signal EM2 may be supplied to the second emission control line EL2*i*, and accordingly, the fourth transistor M4 may be turned off.

During the second period T2, the second transistor M2 may be turned on by the first scan signal GW supplied to the first scan line SL1*i*, the third transistor M3 may be turned on by the second scan signal GC supplied to the second scan line SL2*i*, and the fifth transistor M5 may be turned on by the third scan signal GB supplied to the third scan line SL3*i*. Also, during the second period T2, the supply of the first emission control signal EM1 to the first emission control line EL1*i* may be suspended such that the sixth transistor M6 is turned on.

In case that the third transistor M3 is turned on, the first transistor M1 may be diode-connected. Since the sixth transistor M6 is set to be in a turn-on state during the second period T2, the voltage of the first driving power source VDD may be applied to the first electrode of the first transistor M1. In case that the voltage of the first driving power source VDD is applied to the first electrode of the first transistor M1, the diode-connected first transistor M1 may be turned on, and accordingly, a voltage obtained by subtracting the absolute threshold voltage of the first transistor M1 from the first driving power source VDD may be applied to the first node N1. A voltage corresponding to the threshold voltage of the first transistor M1 may be stored in the second capacitor C2.

During the second period T2, the voltage of the reference power source Vref may be supplied to the first electrode of the first capacitor C1. Therefore, during the second period T2, a voltage corresponding to a difference voltage between the reference power source Vref and the first node N1 may be stored in the first capacitor C1. Since the fifth transistor M5 maintains the turn-on state during the second period T2, the voltage of the initialization power source Vint may be applied to the third node N3.

Figure 5D:
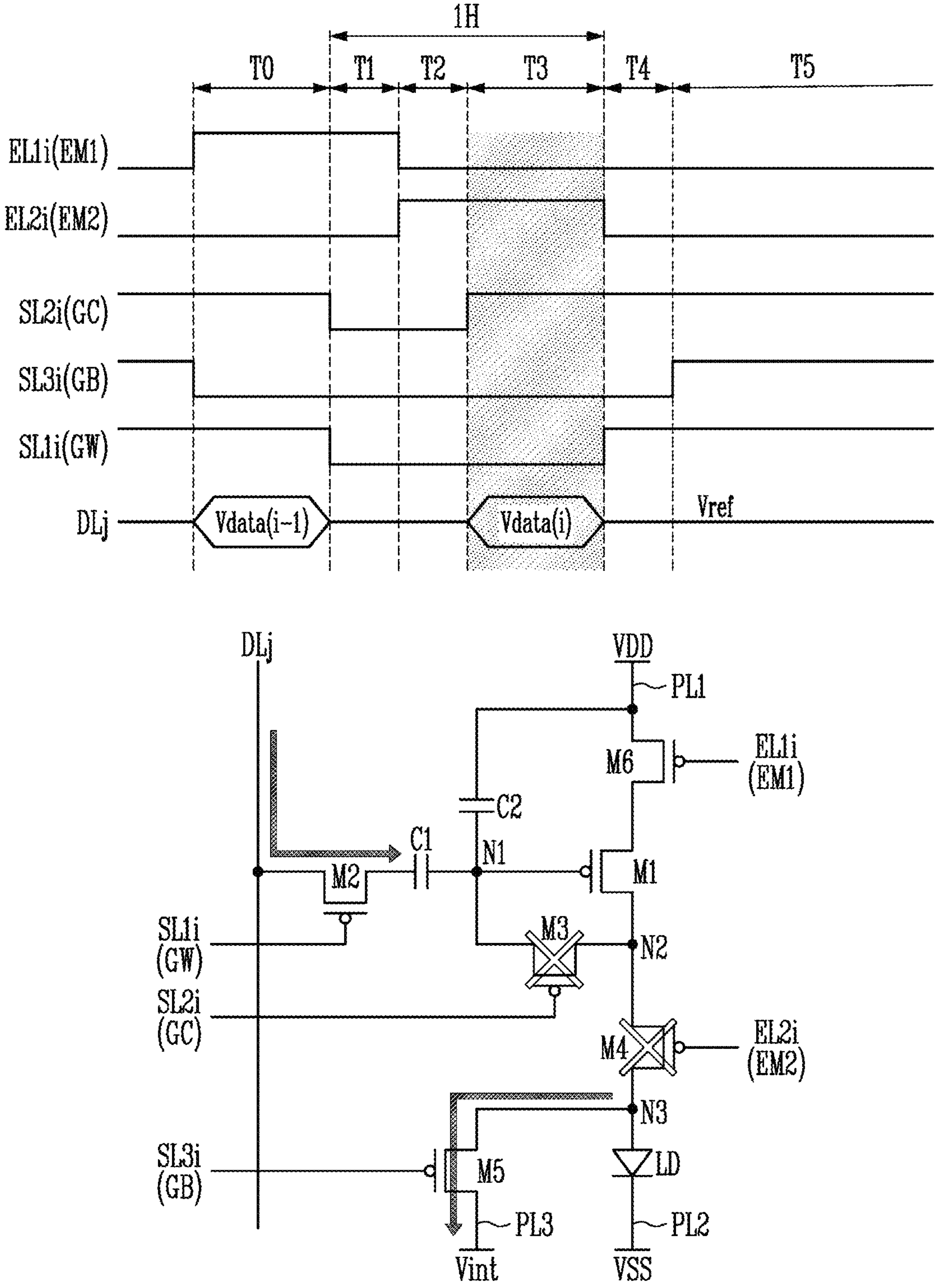

Referring to FIG. 5D, during the third period T3, the second emission control signal EM2 may be supplied to the second emission control line EL2*i*, and accordingly, the fourth transistor M4 may maintain the turn-off state. Also, during the third period T3, the first emission control signal EM1 may not be supplied to the first emission control line EL1*i*, and accordingly, the sixth transistor M6 may maintain the turn-on state.

During the third period T3, the turn-on state of the second transistor M2 may be maintained by the first scan signal GW supplied to the first scan line SL1*i*, and the turn-on state of the fifth transistor M5 may be maintained by the third scan signal GB supplied to the third scan line SL3*i*.

During the third period T3, the voltage Vdata(i) of the data signal may be supplied to the data line DLj. The voltage Vdata(i) of the data signal, which is supplied to the data line DLj, may be supplied to the first electrode of the first capacitor C1 via the second transistor M2.

In case that the voltage Vdata(i) of the data signal is supplied to the first electrode of the first capacitor C1, the first electrode of the first capacitor C1 may be changed from the voltage of the reference power source Vref to the voltage Vdata(i) of the data signal. The voltage of the first node N1 may also be changed by coupling of the first capacitor C1.

A voltage variation of the first node N1 may be determined corresponding to a ratio of the first capacitor C1 and the second capacitor C2. In an embodiment, the voltage of the first node N1 may be changed by a value obtained by multiplying a voltage variation of the first electrode of the first capacitor C1 by C1/(C1+C2) from the voltage obtained by subtracting the absolute threshold voltage of the first transistor M1 from the first driving power source VDD. In case that the voltage variation of the first node N1 is controlled by the ratio of the first capacitor C1 and the second capacitor C2, the voltage range of the data signal may be set sufficiently wide.

In an embodiment, in case that the data signal is directly supplied to the gate electrode of the first transistor M1, the voltage range of the data signal may be set relatively narrow. In case that the data signal has a narrow voltage range, various grayscales (e.g., 256 grayscales) may be implemented using the narrow voltage range, and accordingly, accurate grayscale expression may be difficult.

On the other hand, in an embodiment of the disclosure, in case that the voltage supplied to the gate electrode of the first transistor M1 is controlled by the ratio of the first capacitor C1 and the second capacitor C2, the voltage range of the data signal may be set sufficiently wide. For example, a voltage corresponding to a value obtained by multiplying the voltage of the data signal by C1/(C1+C2) may be transferred to the gate electrode of the first transistor M1, and accordingly, the voltage range of the data signal may be set wide. In case that the data signal has a wide voltage range, grayscales may be readily implemented.

In case that the pixel PXij is applied to a high resolution panel, an image may be displayed using a low driving current, and hence the voltage range of the data signal may be narrowed. In the case of the pixel PXij of the disclosure, the data signal may have a wide voltage range, and accordingly, the pixel PXij may be applied to a high resolution panel.

During the third period T3, the second capacitor C2 may store the voltage of the first node N1. The voltage of the first node N1 may be determined by the threshold voltage of the first transistor M1 and the voltage Vdata(i) of the data signal, and accordingly, a voltage corresponding to the data signal and the threshold voltage of the first transistor M1 may be stored in the second capacitor C2 during the third period T3.

Figure 5E:
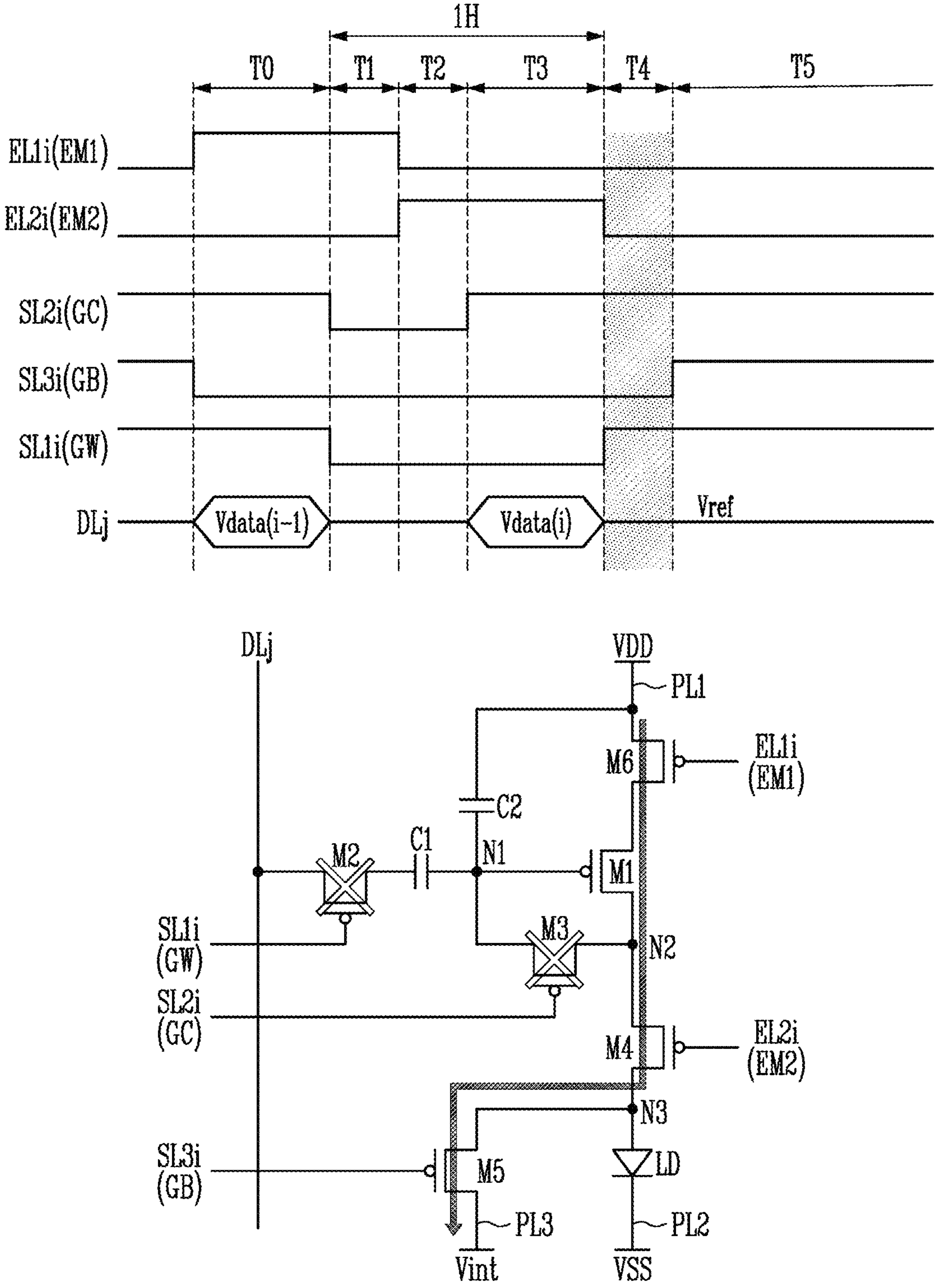

Referring to FIG. 5E, during the fourth period T4, the first emission control signal EM1 may not be supplied to the first emission control line EL1*i*, and the second emission control signal EM2 may not be supplied to the second emission control line EL2*i*. Therefore, the sixth transistor M6 and the fourth transistor M4 may be set to be in the turn-on state during the fourth period T4. During the fourth period T4, the third scan signal GB may be supplied to the third scan line SL3*i*, and accordingly, the fifth transistor M5 may maintain the turn-on state.

During the fourth period T4, the sixth transistor M6 and the fourth transistor M4, which are located on a current path for supplying a current to the light emitting element LD, may be set to be in the turn-on state, and accordingly, the first transistor M1 may control an amount of current supplied from the first driving power source VDD to the third node N3, corresponding to the voltage applied to the first node N1. Since the fifth transistor M5 is set to be in the turn-on state, the current supplied to the third node N3 may be supplied to the initialization power source Vint. For example, during the fourth period T4, the light emitting element LD may be set to be in the non-emission state, and accordingly, the grayscale expression ability of the display device 100 may be improved.

For example, a voltage of the second node N2 may be set approximately as the voltage of the first driving power source VDD throughout the second period T2 and the third period T3. In case that the voltage of the second node N2 is set approximately as the voltage of the first driving power source VDD, an unnecessary current may be supplied to the light emitting element LD. In an embodiment, even in case that a black grayscale is implemented in the pixel PXij, light may be emitted from the light emitting element LD by the voltage of the second node N2. Thus, in the embodiment of the disclosure, a current supplied from the first transistor M1 may be supplied to the initialization power source Vint during the fourth period T4 before the light emitting element LD emits light, and accordingly, the grayscale expression ability of the display device 100 may be improved.

Figure 5F:
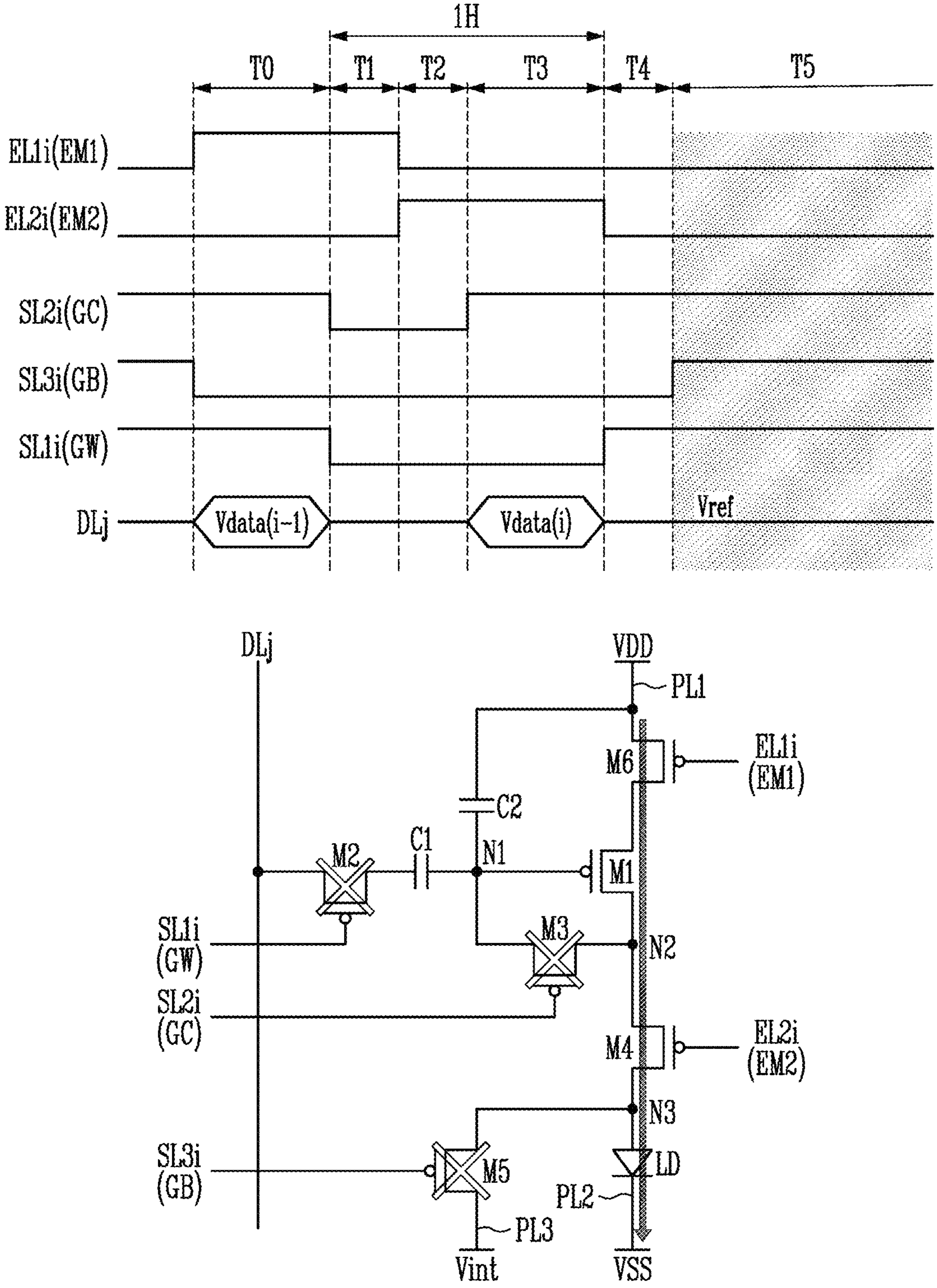

Referring to FIG. 5F, during the fifth period T5, the supply of the third scan signal GB to the third scan line SL3*i* may be suspended such that the fifth transistor M5 is set to be in the turn-off state.

The first transistor M1 may control an amount of current supplied from the first driving power source VDD to the second driving power source VSS via the light emitting element LD, corresponding to the voltage of the first node N1. During the fifth period T5, the light emitting element LD may generate light with a luminance corresponding to an amount of driving current supplied from the first transistor M1.

An amount of current supplied from the first transistor M1 to the light emitting element LD during the fifth period T5 may be determined regardless of the threshold voltage of the first transistor M1 as shown in Equation 1.

$$ILD = K \times \left(\frac{C1}{C1 + C2}\right)^2 \times (Vdata(i) - Vref)^2 \qquad \text{[Equation 1]}$$

In Equation 1, ILD may be a current supplied to the light emitting element, and K may be a proportional constant determined by a mobility of the first transistor M1, a parasitic capacitance, a channel capacity, and the like.

Referring to Equation 1, it can be seen that the amount of current supplied to the first transistor M1 is determined by the voltage Vdata(i) of the data signal and the reference power source Vref, regardless of the threshold voltage of the first transistor M1.

In case that the pixels PX are applied to a high resolution panel, the pixels PX may have a small mounting area (e.g., a few μm). In case that the data lines DL1 to DLm are connected to different source amplifiers included in the data driver 140, a mounting area of the source amplifiers may be widened as compared with the mounting area of the pixels PX. Thus, in an embodiment of the disclosure, the mounting area of the source amplifiers may be minimized using a divider or the like.

Figure 6:
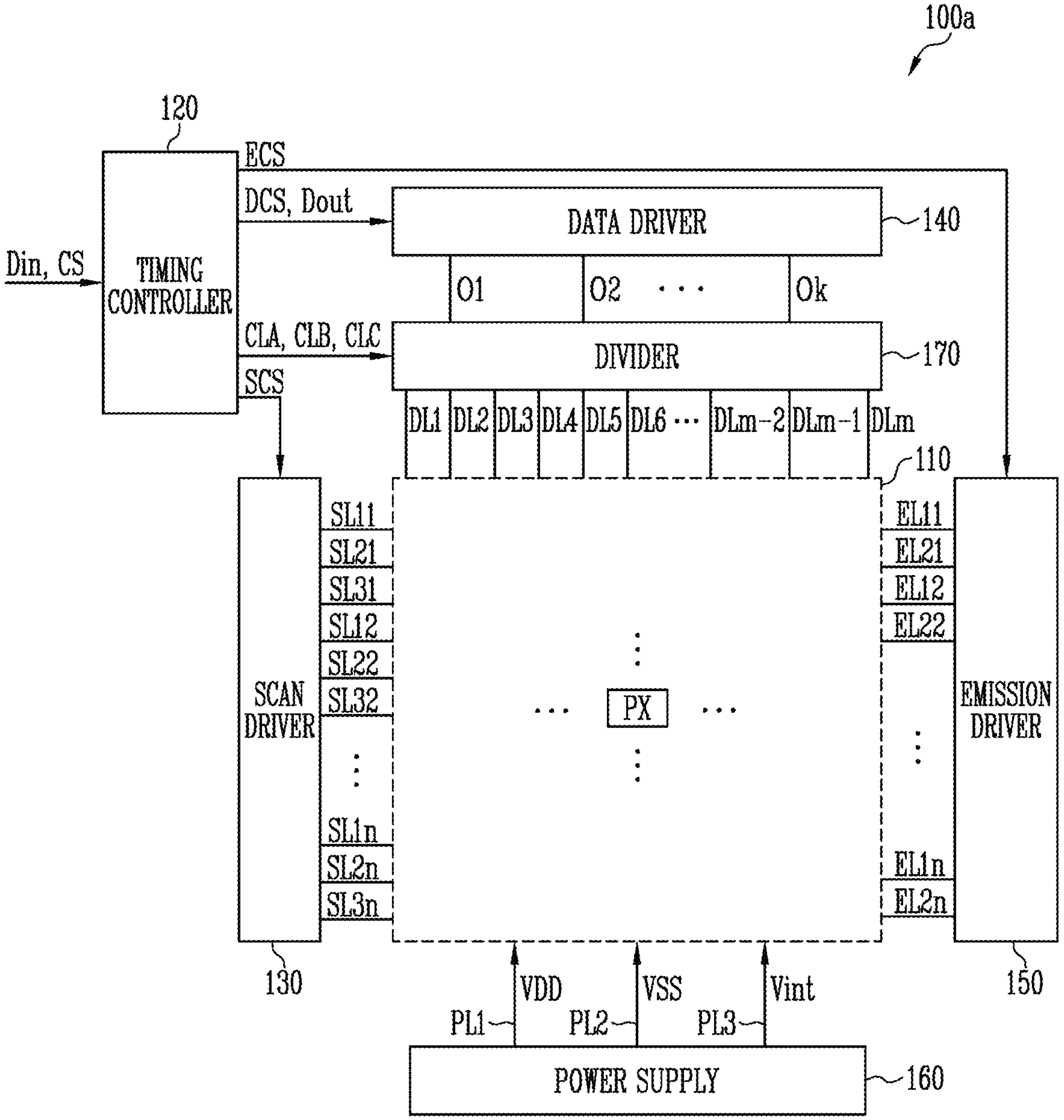
FIG. 6 is a schematic diagram illustrating a display device in accordance with an embodiment of the disclosure.
Figure 7:
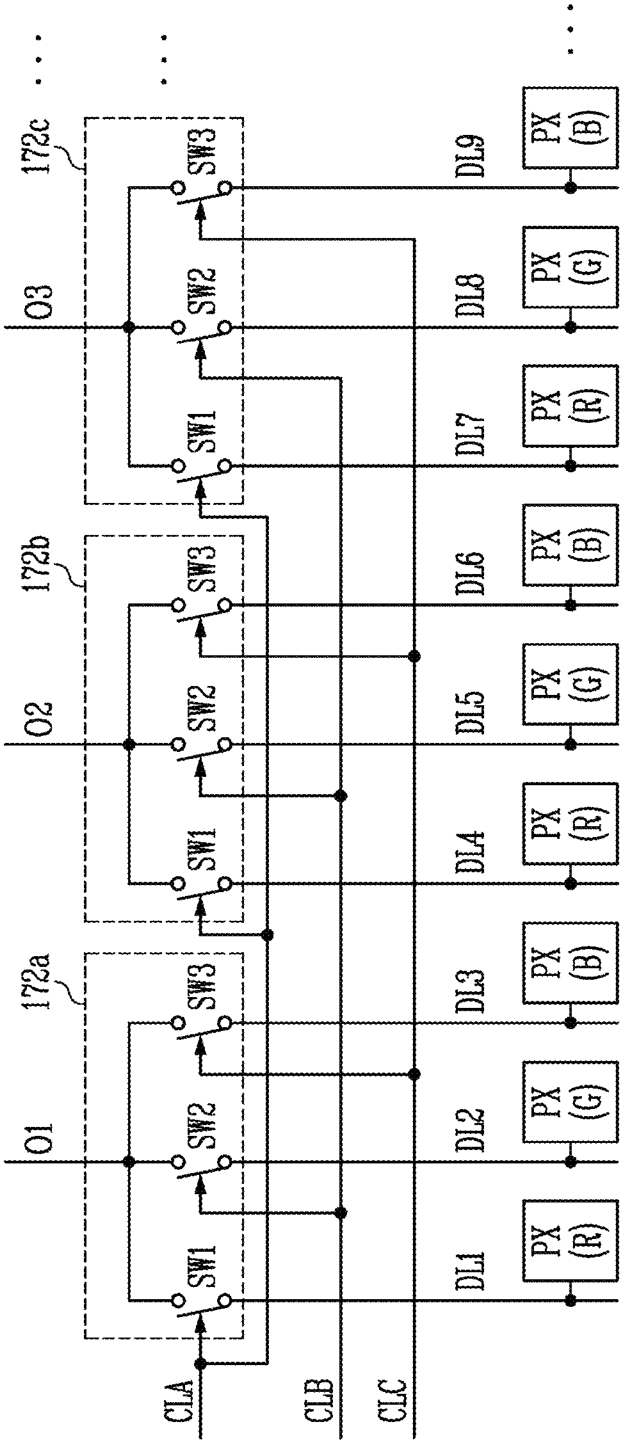
FIGS. 7 and 8 are schematic diagrams illustrating an embodiment of a divider shown in FIG. 6.
Figure 8:
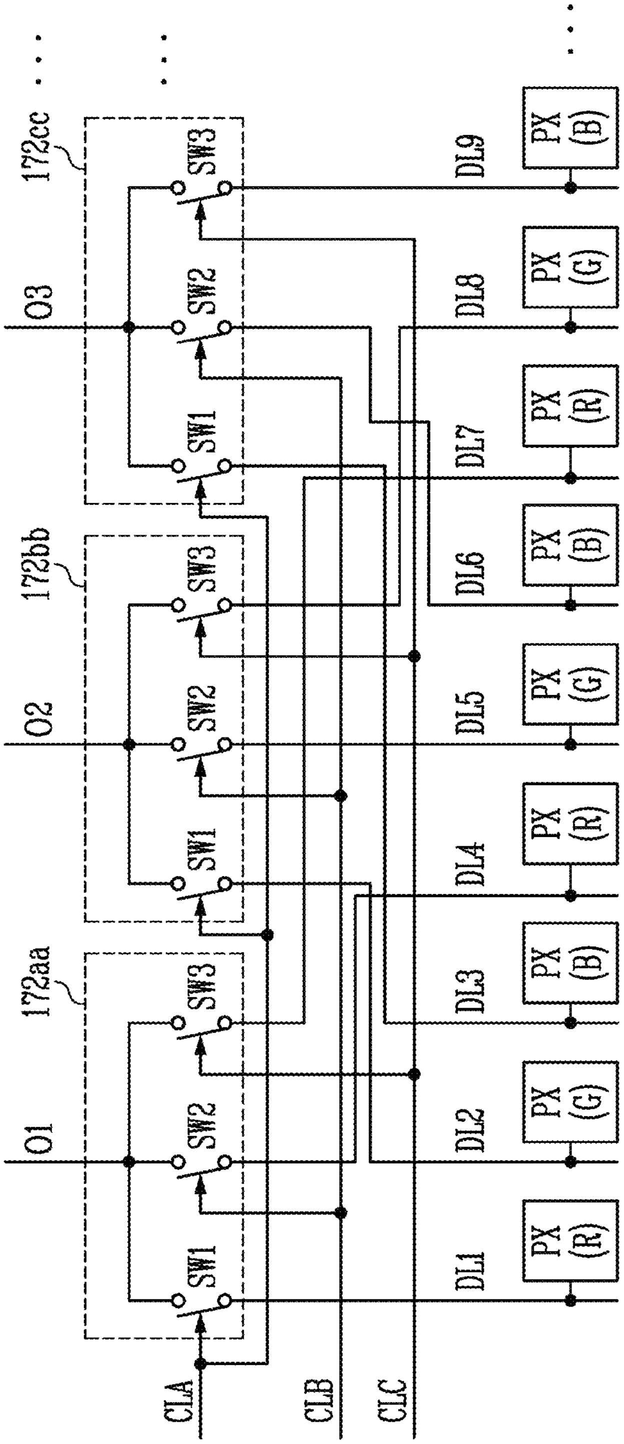

FIG. 6 is a schematic diagram illustrating a display device in accordance with an embodiment of the disclosure. FIGS. 7 and 8 are schematic diagrams illustrating an embodiment of a divider shown in FIG. 6. In FIG. 6, components identical to those shown in FIG. 1 are designated by like reference numerals, and overlapping descriptions will be omitted.

Referring to FIG. 6, the display device 100*a* in accordance with an embodiment of the disclosure may include a pixel unit 110 (or panel), a timing controller 120, a scan driver 130, a data driver 140, an emission driver 150, a power supply 160, and a divider 170.

The data driver 140 may receive output data Dout and a data driving signal DCS from the timing controller 120. The data driving signal DCS may include a sampling signal and/or timing signals for driving of the data driver 140. The data driver 140 may generate a data signal, based on the data driving signal DCS and the output data Dout. In an embodiment, the data driver 140 may generate an analog data signal, based on a grayscale of the output data Dout. The data driver 140 may sequentially supply multiple data signals to each of output lines O1, O2, . . . , and Ok (k is a natural number of m or less) during one horizontal period 1H. In an embodiment, the data driver 140 may sequentially supply three data signals to each of the output lines O1 to Ok for each one horizontal period 1H. Also, the data driver 140 may supply the voltage of the reference power source Vref to the output lines O1 to Ok for at least two horizontal periods 2H.

The divider 170 may be connected to the output lines O1 to Ok and data lines DL1, DL2, DL3, DL4, DL5, DL6, . . . , DLm−2, DLm−1, and DLm. The divider 170 may supply, to multiple data lines, multiple data signals supplied from each of the output lines O1 to Ok. To this end, the divider 170 may include multiple demultiplexers (or demuxes) 172*a*, 172*b*, 172*c*, . . . as shown in FIGS. 7 and 8.

In case that data signals generated by the data driver 140 are supplied to the data lines DL1 to DLm via the divider 170, the number of the output lines O1 to Ok connected to the data driver 140 may be decreased. In other words, in case that the data signals generated by the data driver 140 are supplied to the data lines DL1 to DLm via the divider 170, the number of source amplifiers respectively connected to the output lines O1 to Ok may be decreased, and accordingly, pixels PX may be applied to a high resolution panel.

Referring to FIG. 7, the divider 170 may include demuxes 172*a*, 172*b*, 172*c*, . . . . A demux 172*a* may supply, to data lines DL1, DL2, and DL3, the voltage of the reference power source Vref and data signals, which are supplied from a first output line O1. The data lines DL1, DL2, and DL3 may be connected to pixels PX(R), PX(G), and PX(B) emitting lights of different colors.

In an embodiment, a first data line DL1 may be electrically connected to a pixel PX(R) of a first color, a second data line DL2 may be electrically connected to a pixel PX(G) of a second color, and a third data line DL3 may be electrically connected to a pixel PX(B) of a third color. In an embodiment, the first color may be red, the second color may be green, and the third color may be blue.

A demux 172*b* may supply, to data lines DL4, DL5, and DL6, the voltage of the reference power source Vref and data signals, which are supplied from a second output line O2. The data lines DL4, DL5, and DL6 may be connected to pixels PX(R), PX(G), and PX(B) emitting lights of different colors.

A demux 172*c* may supply, to data lines DL7, DL8, and DL8, the voltage of the reference power source Vref and data signals, which are supplied from a third output line O3. The data lines DL7, DL8, and DL9 may be connected to pixels PX(R), PX(G), and PX(B) emitting lights of different colors.

Each of the demuxes 172*a*, 172*b*, and 172*c* may include a first switch SW1, a second switch SW2, and a third switch SW3. The first switch SW1 may be turned on or turned off corresponding to a first control signal CLA, the second switch SW2 may be turned on or turned off corresponding to a second control signal CLB, and the third switch SW3 may be turned on or turned off corresponding to a third control signal CLC.

That the first control signal CLA, the second control signal CLB, and the third control signal CLC are supplied may mean that a voltage (e.g., a low voltage) at which each of the first switch SW1, the second switch SW2, and the third switch SW3 is turned on is supplied. That the first control signal CLA, the second control signal CLB, and the third control signal CLC are not supplied may mean that a voltage (e.g., a high voltage) at which each of the first switch SW1, the second switch SW2, and the third switch SW3 is turned off is supplied.

A first switch SW1 included in the demux 172*a* may be connected between the first output line O1 and the first data line DL1, and be turned on in case that the first control signal CLA (e.g., the low voltage) is supplied from the timing controller 120. In case that the first switch SW1 is turned on, the first output line O1 and the first data line DL1 may be electrically connected to each other.

A second switch SW2 included in the demux 172*a* may be connected between the first output line O1 and the second data line DL2, and be turned on in case that the second control signal CLB (e.g., the low voltage) is supplied from the timing controller 120. In case that the second switch SW2 is turned on, the first output line O1 and the second data line DL2 may be electrically connected to each other.

A third switch SW3 included in the demux 172*a* may be connected between the first output line O1 and the third data line DL3, and be turned on in case that the third control signal CLC (e.g., the low voltage) is supplied from the timing controller 120. In case that the third switch SW3 is turned on, the first output line O1 and the third data line DL3 may be electrically connected to each other.

A first switch SW1 included in the demux 172*b* may be connected between the second output line O2 and a fourth data line DL4, a second switch SW2 included in the demux 172*b* may be connected between the second output line O2 and a fifth data line DL5, and a third switch SW3 included in the demux 172*b* may be connected between the second output line O2 and a sixth data line DL6.

A first switch SW1 included in the demux 172*c* may be connected between the third output line O3 and a seventh data line DL7, a second switch SW2 included in the demux 172*c* may be connected between the third output line O3 and an eighth data line DL8, and a third switch SW3 included in the demux 172*c* may be connected to the third output line O3 and a ninth data line DL9.

Referring to FIG. 8, the divider 170 may include demuxes 172*aa*, 172*bb*, 172*cc*, . . . .

A demux 172*aa* may supply, to data lines DL1, DL4, and DL7, the voltage of the reference power source Vref and data signals, which are supplied from the first output line O1. The data lines DL1, DL4, and DL7 may be connected to pixels PX(R) emitting light of the first color (emitting light of a same color).

A demux 172*bb* may supply, to data lines DL2, DL5, and DL8, the voltage of the reference power source Vref and data signals, which are supplied from the second output line O2. The data lines DL2, DL5, and DL8 may be connected to pixels PX(G) emitting light of the second color (emitting light of a same color).

A demux 172*cc* may supply, to data lines DL3, DL6, and DL9, the voltage of the reference power source Vref and data signals, which are supplied from the third output line O3. The data lines DL3, DL6, and DL9 may be connected to pixels PX(B) emitting light of the third color (emitting light of a same color).

Each of the demuxes 172*aa*, 172*bb*, 172*cc*, . . . may include a first switch SW1, a second switch SW2, and a third switch SW3. The first switch SW1 may be turned on or turned off corresponding to the first control signal CLA, the second switch SW2 may be turned on or turned off corresponding to the second control signal CLB, and the third switch SW3 may be turned on or turned off corresponding to the third control signal CLC.

A first switch SW1 included in the demux 172*aa* may be connected between the first output line O1 and the first data line DL1, and be turned on in case that the first control signal CLA is supplied from the timing controller 120. In case that the first switch SW1 is turned on, the first output line O1 and the first data line DL1 may be electrically connected to each other.

A second switch SW2 included in the demux 172*aa* may be connected between the first output line O1 and the fourth data line DL4, and be turned on in case that the second control signal CLB is supplied from the timing controller 120. In case that the second switch SW2 is turned on, the first output line O1 and the fourth data line DL4 may be electrically connected to each other.

A third switch SW3 included in the demux 172*aa* may be connected between the first output line O1 and the seventh data line DL7, and be turned on in case that the third control signal CLC is supplied from the timing controller 120. In case that the third switch SW3 is turned on, the first output line O1 and the seventh data line DL7 may be electrically connected to each other.

A first switch SW1 included in the demux 172*bb* may be connected between the second output line O2 and the second data line DL2, a second switch SW2 included in the demux 172*bb* may be connected between the second output line O2 and the fifth data line DL5, and a third switch SW3 included in the demux 172*bb* may be connected between the second output line O2 and the eighth data line DL8.

A first switch SW1 included in the demux 172*cc* may be connected between the third output line O3 and the third data line DL3, a second switch SW2 included in the demux 172*cc* may be connected between the third output line O3 and the sixth data line DL6, and a third switch SW3 included in the demux 172*cc* may be connected between the third output line O3 and the ninth data line DL9.

Figure 9:
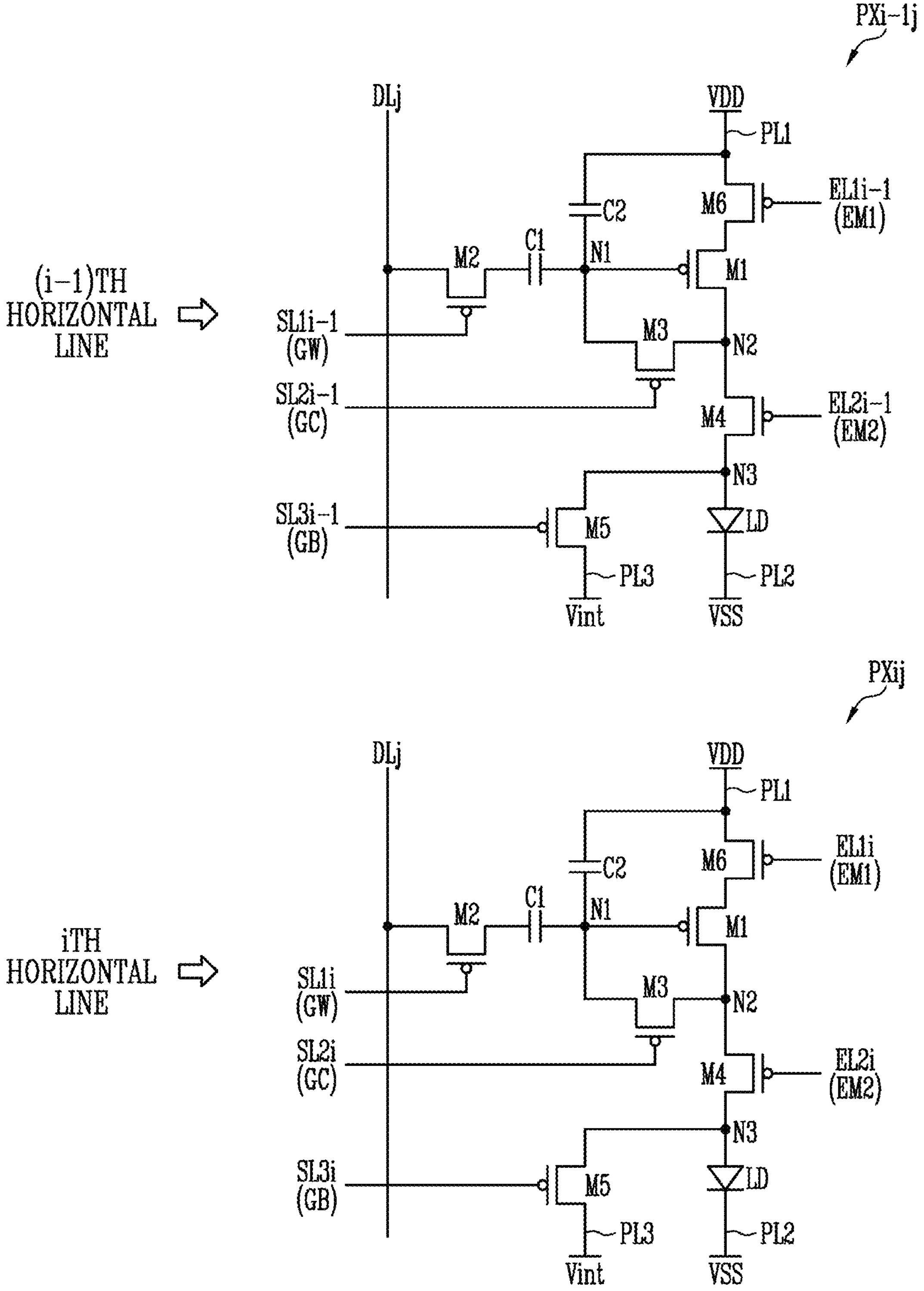
FIG. 9 is a schematic diagram illustrating pixels located on an (i−1)th horizontal line and an ith horizontal line.
Figure 10:
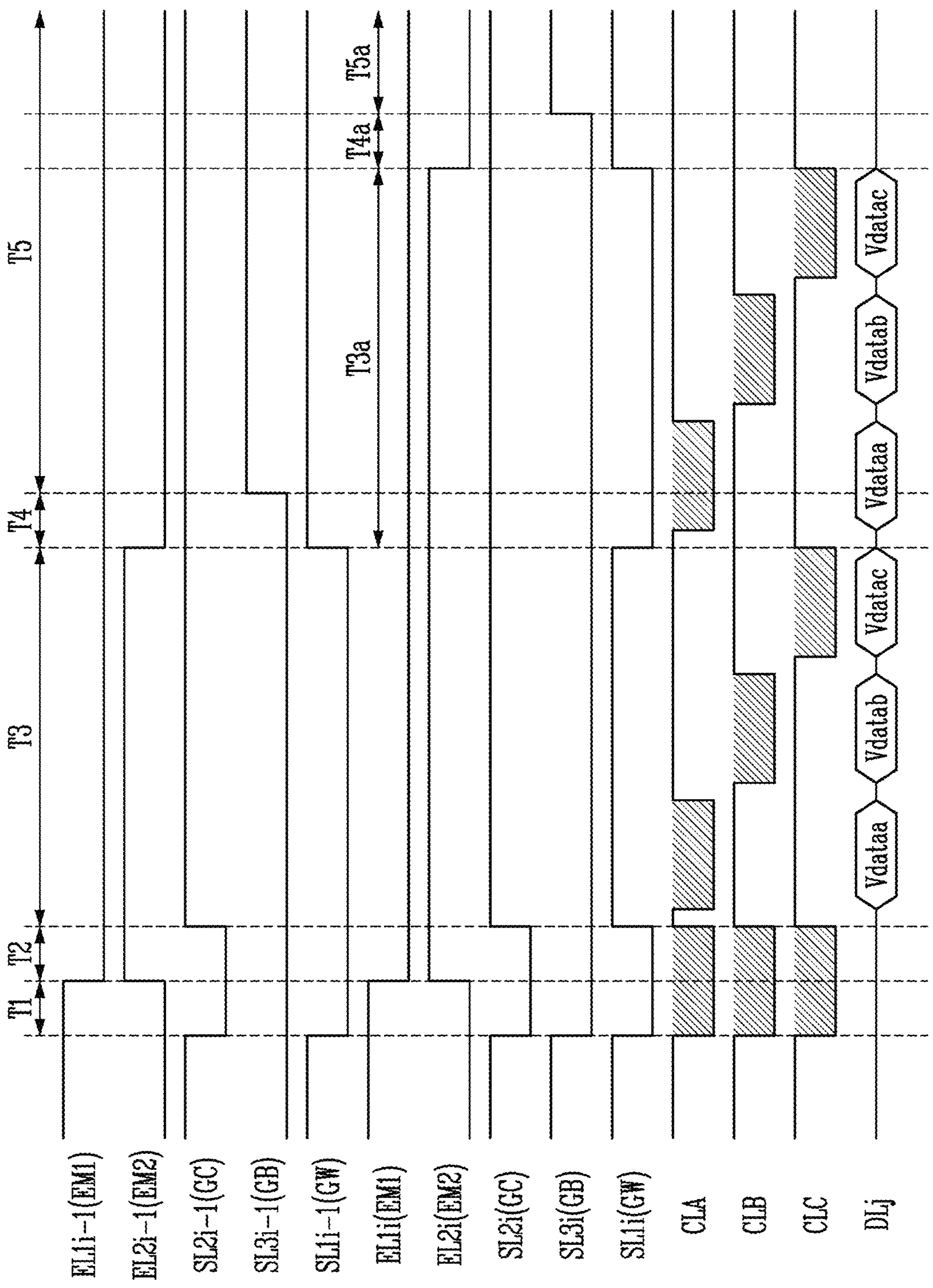
FIG. 10 is a schematic waveform diagram illustrating a method of driving the pixels shown in FIG. 9.

FIG. 9 is a schematic diagram illustrating pixels located on an (i−1)th horizontal line and an ith horizontal line. FIG. 10 is a schematic waveform diagram illustrating a method of driving the pixels shown in FIG. 9.

Referring to FIGS. 6 to 10, in an embodiment of the disclosure, pixels located on at least two horizontal lines may share a first period T1 and a second period T2. In an embodiment, first and second periods T1 and T2 of a pixel PXi-1*j* located on an (i−1)th horizontal line and a pixel PXij located on an ith horizontal line may overlap with each other. In an embodiment, the pixel PXi-1*j* located on the (i−1)th horizontal line and the pixel PXij located on the ith horizontal line may be simultaneously supplied with the voltage of the reference power source Vref.

During the first period T1 and the second period T2, the data driver 140 may supply the voltage of the reference power source Vref to each of the output lines O1 to Ok. During the first period T1 and the second period T2, the timing controller 120 may supply the first control signal CLA and the third control signal CLC to the divider 170. During the first period T1 and the second period T2, the first to third switches SW1 to SW3 included in each of the demuxes 172*a*, 172*b*, 172*c*, . . . or 172*aa*, 172*bb*, 172*cc*, . . . may be turned on. The voltage of the reference power source Vref may be supplied to the data lines DL1 to DLm during the first period T1 and the second period T2.

During the first period T1, the first emission control signal EM1 may be supplied to first emission control lines EL1*i*-1 and EL1*i*, and accordingly, a sixth transistor M6 included in each of the pixels PXi-1*j* and PXij may be turned off.

During the first period T1, the first scan signal GW may be supplied to first scan lines SL1*i*-1 and SL1*i*, the second scan signal GC may be supplied to second scan lines SL2*i*-1 and SL2*i*, and the third scan signal GB may be supplied to third scan lines SL3*i*-1 and SL3*i*.

In case that the first scan signal GW is supplied to the first scan lines SL1*i*-1 and SL1*i*, a second transistor M2 included in each of the pixels PXi-1*j* and PXij may be turned on. In case that the second scan signal GC is supplied to the second scan lines SL2*i*-1 and SL2*i*, a third transistor M3 included in each of the pixels PXi-1*j* and PXij may be turned on. In case that the third scan signal GB is supplied to the third scan lines SL3*i*-1 and SL3*i*, a fifth transistor M5 included in each of the pixels PXi-1*j* and PXij may be turned on.

During the first period T1, the voltage of the reference power source Vref may be supplied to a first electrode of a first capacitor C1 included in each of the pixels PXi-1*j* and PXij, and the voltage of the initialization power source Vint may be supplied to a first node N1. The first capacitor C1 included in each of the pixels PXi-1*j* and PXij may be initialized by the reference power source Vref and the initialization power source Vint regardless of the voltage supplied in a previous period (or previous frame period). Similarly, a second capacitor C2 included in each of the pixels PXi-1*j* and PXij may be initialized by the initialization power source Vint and the first driving power source VDD regardless of the voltage supplied in a previous period (or previous frame period).

During the second period T2, the second emission control signal EM2 may be supplied to second emission control lines EL2*i*-1 and EL2*i*, and accordingly, a fourth transistor M4 included in each of the pixels PXi-1*j* and PXij may be turned off.

During the second period T2, the second transistor M2 included in each of the pixels PXi-1*j* and PXij may be turned on by the first scan signal GW supplied to the first scan lines SL1*i*-1 and SL1*i*, the third transistor M3 included in each of the pixels PXi-1*j* and PXij may be turned on by the second scan signal GC supplied to the second scan lines SL2*i*-1 and SL2*i*, and the fifth transistor M5 included in each of the pixels PXi-1*j* and PXij may be turned on by the third scan signal GB supplied to the third scan lines SL3*i*-1 and SL3*i*. Also, during the second period T2, the supply of the first emission control signal EM1 to the first emission control lines EL1*i*-1 and EL1*i* may be suspended such that the sixth transistor M6 included in each of the pixels PXi-1*j* and PXij is turned on.

In case that the third transistor M3 included in each of the pixels PXi-1*j* and PXij is turned on, a first transistor M1 included in each of the pixels PXi-1*j* and PXij may be diode-connected. Since the sixth transistor M6 included in each of the pixels PXi-1*j* and PXij is set to be in the turn-on state during the second period T2, the voltage of the first driving power source VDD may be applied to a first electrode of the first transistor M1 included in each of the pixels PXi-1*j* and PXij. In case that the voltage of the first driving power source VDD is applied to the first electrode of the first transistor M1, the diode-connected first transistor M1 may be turned on, and accordingly, a voltage obtained by subtracting an absolute threshold voltage of the first transistor M1 from the first driving power source VDD may be applied to the first node N1. A voltage corresponding to a threshold voltage of the first transistor M1 may be stored in the second capacitor C2 included in each of the pixels PXi-1*j* and PXij.

During the second period T2, the voltage of the reference power source Vref may be supplied to the first electrode of the first capacitor C1 included in each of the pixels PXi-1*j* and PXij. Therefore, during the second period T2, a voltage corresponding to a difference voltage between the reference power source Vref and the first node N1 may be stored in the first capacitor C1. Since the fifth transistor M5 included in each of the pixels PXi-1*j* and PXij maintains the turn-on state during the second period T2, the voltage of the initialization power source Vint may be applied to a third node N3.

During a third period T3 and a fourth period T4, the first scan signal GW may not be supplied to the first scan line SL1*i*, and accordingly, voltages Vdataa, Vdatab, and Vdatac of a data signal may not be supplied to the pixel PXij located on the ith horizontal line. During the third period T3, a third period T3*a*, and a fourth period T4*a*, the third scan signal GB may be supplied to the third scan line SL3*i*, and accordingly, the fifth transistor M5 included in the pixel PXij may maintain the turn-on state.

The third period T3 may be included in a previous horizontal period, and may be a period in which the voltages Vdataa, Vdatab, and Vdatac of the data signal are supplied to the pixel PXi-1*j* located on the (i−1)th horizontal line. The third period T3*a* may be included in a current horizontal period, and may be a period in which the voltages Vdataa, Vdatab, and Vdatac of the data signal are supplied to the pixel PXij located on the ith horizontal line.

The fourth period T4 may be a luminance control period, and a fifth period T5 may be an emission period of the pixel PXij. The fourth period T4 may overlap the third period T3*a*. The fifth period T5 may overlap the third period T3*a*, the fourth period T4*a*, and a fifth period T5*a*.

In the third period T3, the second emission control signal EM2 may be supplied to the second emission control line EL2*i*-1, and accordingly, the fourth transistor M4 included in the pixel PXi-1*j* may maintain the turn-off state. Also, in the third period T3, the second transistor M2 included in the pixel PXi-1*j* may be set to be in the turn-on state by the first scan signal GW supplied to the first scan line SL1*i*-1.

During the third period T3, the timing controller 120 may sequentially supply the first control signal CLA, the second control signal CLB, and the third control signal CLC. During the third period T3, the voltages Vdataa, Vdatab, and Vdatac of the data signal may be sequentially supplied to the data lines connected to the demuxes 172*a*, 172*b*, 172*c*, . . . or 172*aa*, 172*bb*, 172*cc*, . . . , and accordingly, the voltage of the data signal may be stored in the pixel PXi-1*j*. An operation process of the third period T3 is similar to the embodiment described with reference to FIG. 5D. Also, an operation process of the fourth period T4 and the fifth period T5 are similar to the embodiment described with reference to FIGS. 5E and 5F, and therefore, overlapping descriptions will be omitted.

During the third period T3*a*, the second emission control signal EM2 may be supplied to the second emission control line EL2*i*, and accordingly, the fourth transistor M4 included in the pixel PXij may maintain the turn-off state. In the third period T3*a*, the second transistor M2 included in the pixel PXij may be set to be in the turn-on state by the first scan signal GW supplied to the first scan line SL1*i*.

During the third period T3*a*, the timing controller 120 may sequentially supply the first control signal CLA, the second control signal CLB, and the third control signal CLC. During the third period T3*a*, the voltages Vdataa, Vdatab, and Vdatac of the data signal may be sequentially supplied to the data lines connected to the demuxes 172*a*, 172*b*, 172*c*, . . . or 172*aa*, 172*bb*, 172*cc*, . . . , and accordingly, the voltage of the data signal may be stored in the pixel PXij. An operation process of the third period T3*a* is similar to the embodiment described with reference to FIG. 5D. Also, an operation process of the fourth period T4*a* and the fifth period T5*a* are similar to the embodiment described with reference to FIGS. 5E and 5F, and therefore, overlapping descriptions will be omitted.

As such, in an embodiment of the disclosure, the pixels PXi-1*j* and PXij located on the two horizontal lines may share the first period T1 and the second period T2, so that a driving time of the divider 170 (or the demuxes 172*a*, 172*b*, 172*c*, . . . or 172*aa*, 172*bb*, 172*cc*, . . . ) may be secured. Although an embodiment that the pixels PXi-1*j* and PXij located on the two horizontal lines share the first period T1 and the second period T2 is illustrated in FIG. 10, the disclosure is not limited thereto. For example, pixels located on at least three horizontal lines may share the first period T1 and the second period T2, and accordingly, the driving time of the divider 170 may be secured.

Figure 11:
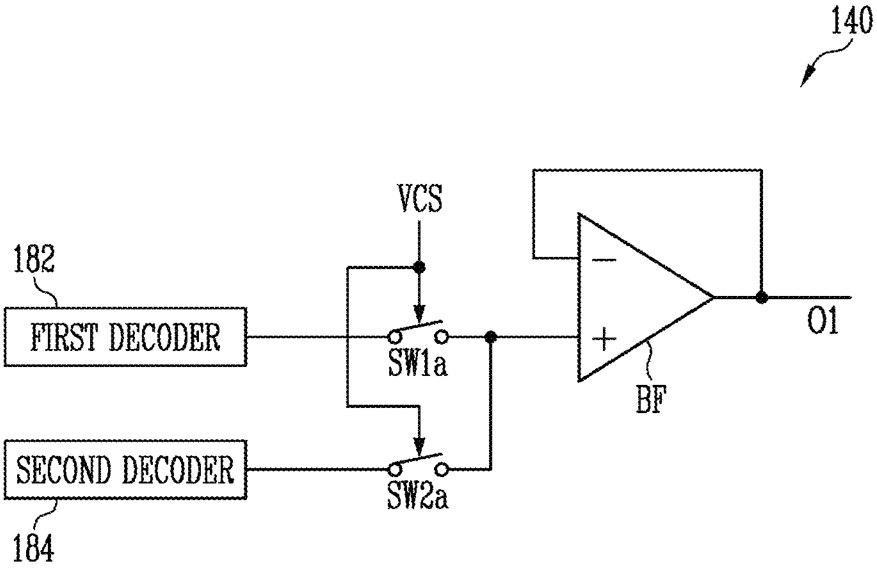
FIG. 11 is a schematic diagram illustrating an output channel of a data driver.

FIG. 11 is a schematic diagram illustrating an output channel of the data driver. In FIG. 11, an output channel connected to the first output line O1 is illustrated.

Referring to FIG. 11, an output channel of the data driver 140 in accordance with an embodiment of the disclosure may include buffer BF (or source amplifier), a first decoder 182, and a second decoder 184.

An output terminal of the buffer BF may be connected to the output line O1. An input terminal of the buffer BF may be connected to the first decoder 182 via a first switch SW1*a*. The input terminal of the buffer BF may be connected to the second decoder 184 via a second switch SW2*a*. The buffer BF may supply, to the output line O1, a data signal supplied from the first decoder 182 or the voltage of the reference power source Vref supplied from the second decoder 184.

The first decoder 182 may select a gamma voltage supplied from a gamma supply (not shown), corresponding to the output data Dout input from the timing controller 120, and supply the selected gamma voltage to the buffer BF via the first switch SW1*a*. The gamma voltage selected by the output data Dout may be a data signal.

The second decoder 182 may select a specific voltage among gamma voltages generated by the gamma supply as the voltage of the reference power source Vref, and supply the voltage of the reference power source Vref to the buffer BF via the second switch SW2*a*.

The first switch SW1*a* may be connected between the first decoder 182 and the buffer BF. The first switch SW1*a* may be turned on during the third period T3 and the third period T3*a*, which are shown in FIG. 10, corresponding to a voltage control signal VCS supplied from the timing controller 120.

The second switch SW2*a* may be connected between the second decoder 184 and the buffer BF. The second switch SW2*a* may be turned on during the first period T1 and the second period T2, which are shown in FIG. 10, corresponding to the voltage control signal VCS supplied from the timing controller 120.

In an embodiment of the disclosure, the data signal and the reference power source Vref may be supplied to the output line O1 via a same buffer BF. An offset of the buffer BF, which is included in the data signal, and an offset of the buffer BF, which is included in the reference power source Vref, may be cancelled, and accordingly, display quality may be improved.

Figure 12:
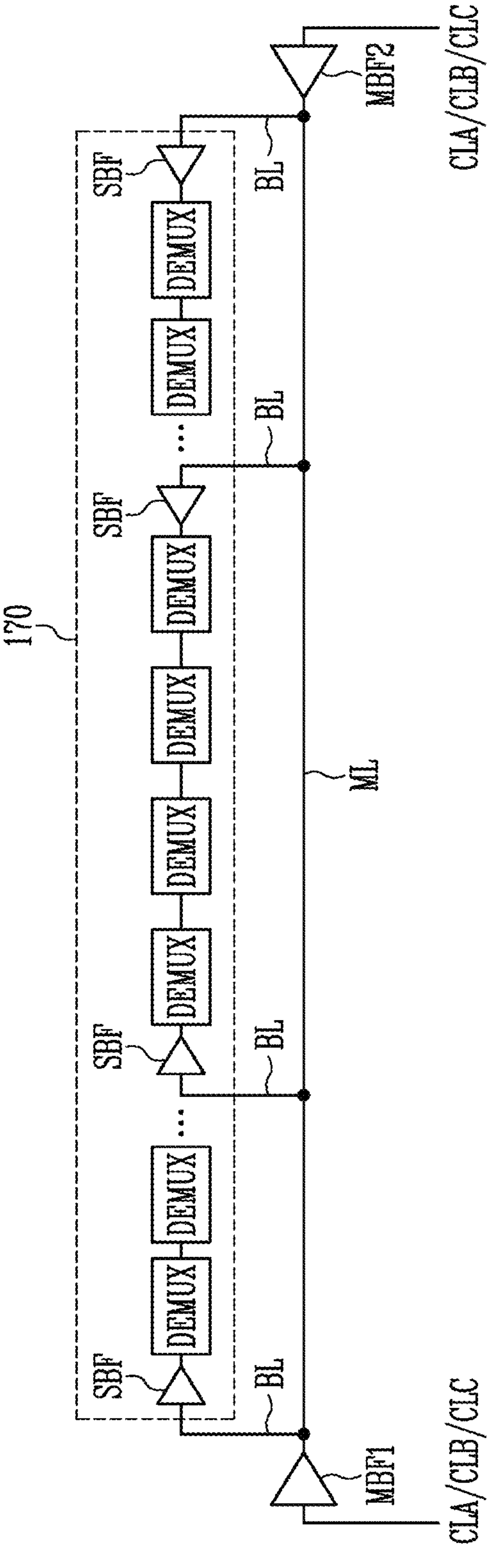
FIGS. 12 and 13 are schematic diagrams illustrating connection between a timing controller and the divider in accordance with an embodiment of the disclosure.
Figure 13:
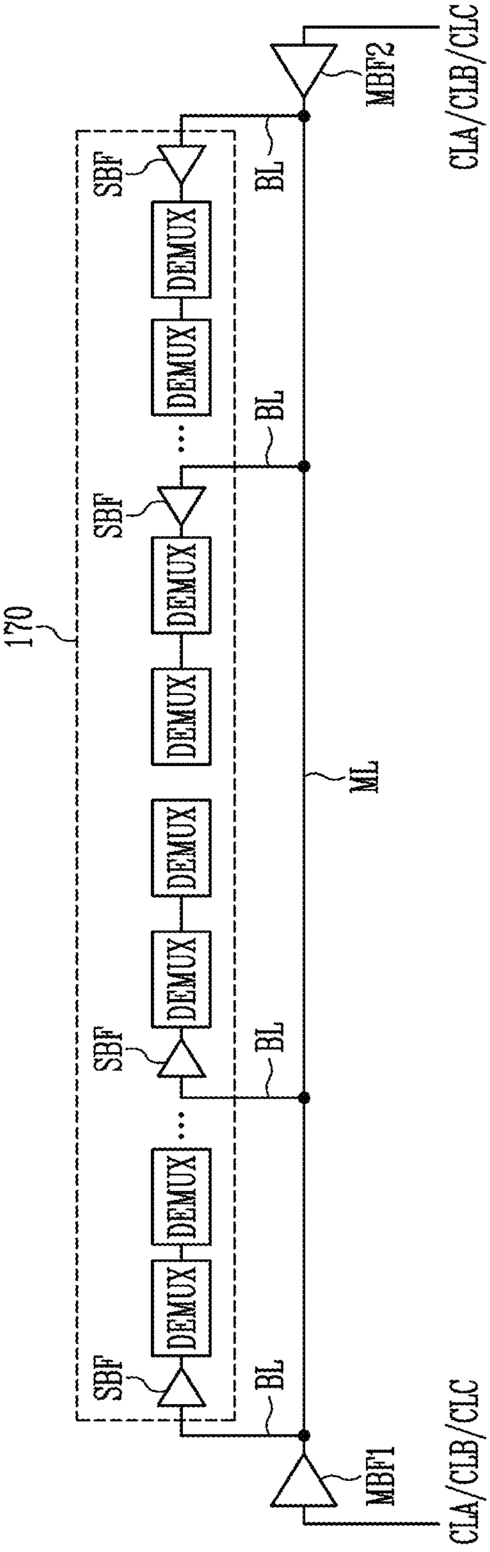

FIGS. 12 and 13 are schematic diagrams illustrating connection between the timing controller and the divider in accordance with an embodiment of the disclosure.

Referring to FIG. 12, the timing controller 120 may supply, to a main line ML, control signals CLA, CLB, and CLC (or at least one of the control signals CLA, CLB, and CLC).

A first main buffer MBF1 may be installed at a first side of the main line ML, and a second main buffer MBF2 may be installed at a second side of the main line ML. The first side may be a side (e.g., a left side) of the main line ML, and the second side may be another side (e.g., a right side) of the main line ML. The timing controller 120 may supply the control signals CLA, CLB, and CLC to the main line ML via the first main buffer MBF1 and the second main buffer MBF2.

Multiple branch lines BL may branch off from the main line ML. A sub-buffer SBF may be connected to one of the branch lines BL. Each of the sub-buffers SBF may be connected to multiple demuxes DEMUX. The sub-buffer SBF may supply the control signals CLA, CLB, and CLC from the main line ML to a demux DEMUX connected to the sub-buffer SBF.

In an embodiment of the disclosure, the control signals CLA, CLB, and CLC may be supplied to the main line ML, using the main buffers MBF1 and MBF2, and the sub-buffer SBF may be added to the branch line BL branching off from the main line ML, thereby supplying the control signals CLA, CLB, and CLC to the demuxes DEMUX. A delay of the control signals CLA, CLB, and CLC may be minimized.

Demuxes DEMUX located at a central portion of the main line ML may be connected to two sub-buffers SBF. In an embodiment, the demuxes DEMUX located at the central portion of the main line ML may be supplied with the control signals CLA, CLB, and CLC from sub-buffers SFB located at a first side and a second side of the demuxes DEMUX. However, the disclosure is not limited thereto, and the demuxes DEMUX located at the central portion of the main line ML may be electrically connected to one sub-buffer SBF as shown in FIG. 13.

Although an embodiment that the control signals CLA, CLB, and CLC are supplied to one main line ML is illustrated in FIGS. 12 and 13, the disclosure is not limited thereto. In another embodiment, three main lines ML may be formed (or disposed) corresponding to each of the control signals CLA, CLB, and CLC, and a sub-buffer SBF may be formed (or disposed) to be connected to one of branch lines BL branching off from one of the three main lines ML.

Figure 14A:
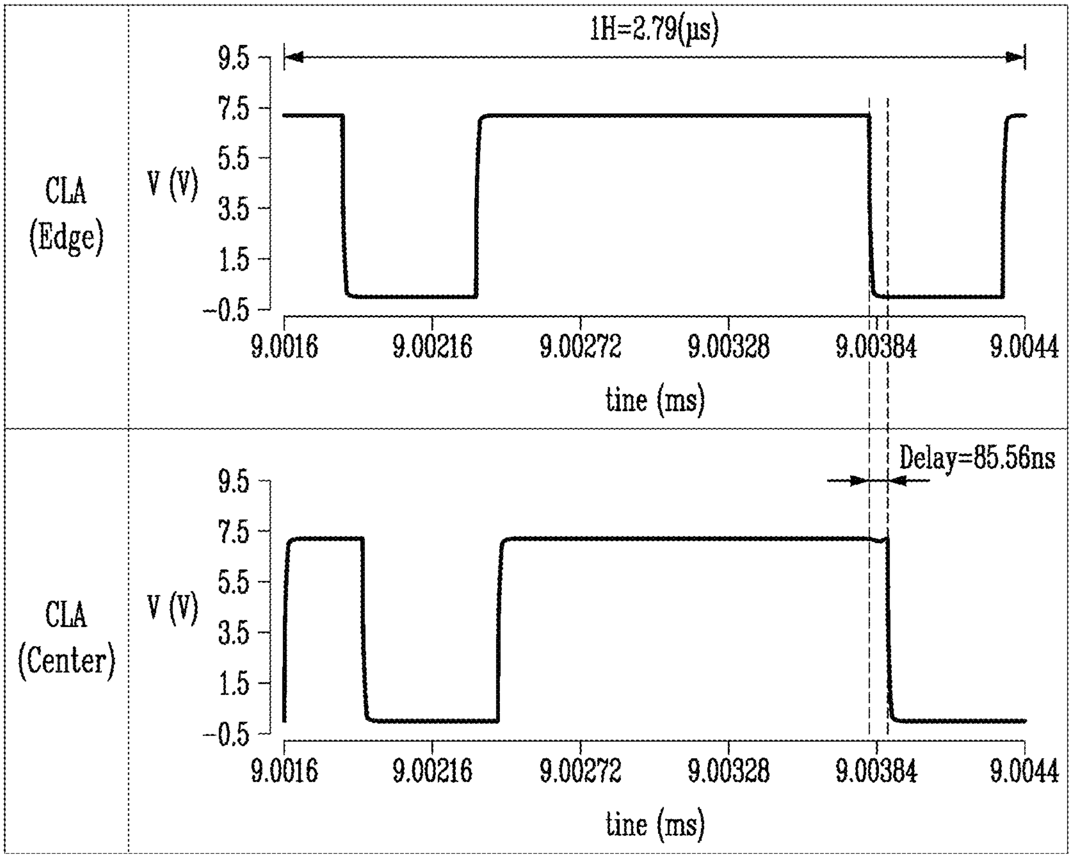
FIG. 14A is a schematic diagram illustrating delay of a control signal in accordance with a comparative example.
Figure 14B:
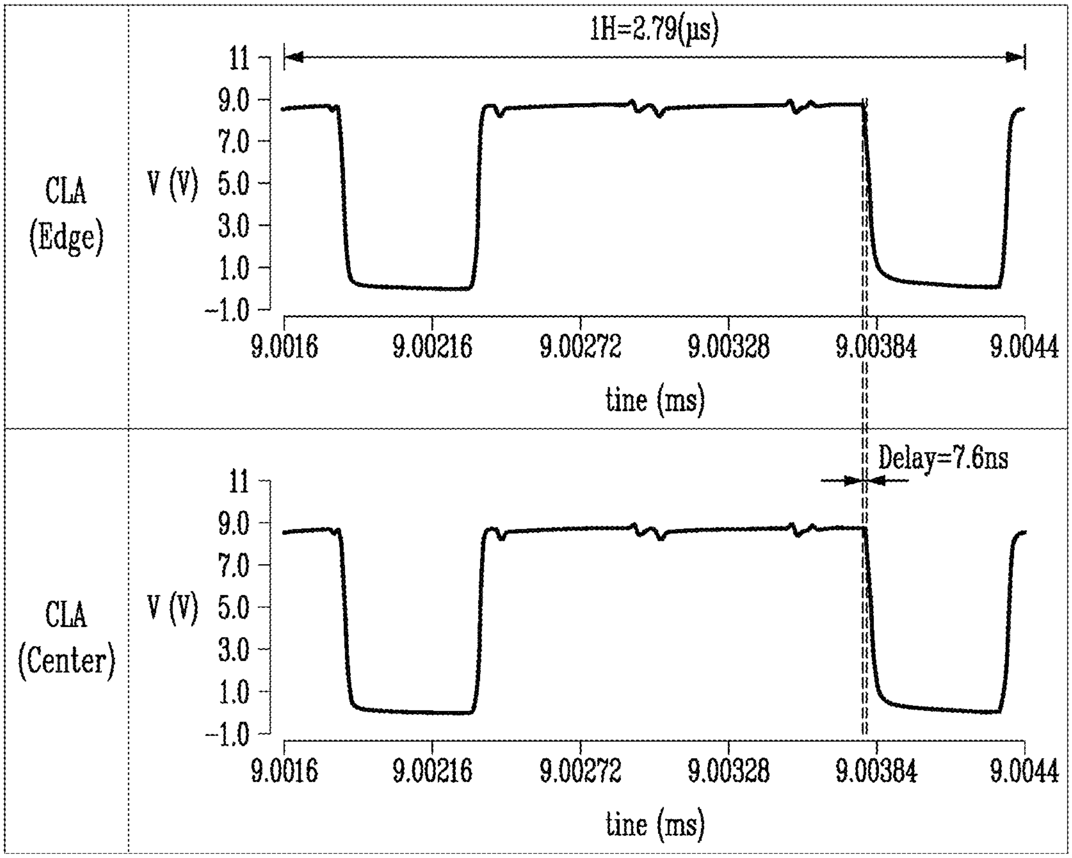
FIG. 14B is a schematic diagram illustrating delay of a control signal in accordance with an embodiment of the disclosure, which is shown in FIG. 12.

FIG. 14A is a schematic diagram illustrating delay of a control signal in accordance with a comparative example. FIG. 14B is a schematic diagram illustrating delay of a control signal in accordance with an embodiment of the disclosure, which is shown in FIG. 12. In FIGS. 14A and 14B, the Y axis may be voltage, and the X axis may be time. The comparative example shown in FIG. 14 shows a case where multiple main buffers are formed on the main line ML. In FIGS. 14A and 14B, it is assumed that one horizontal period 1H is 2.79 μs.

Referring to FIGS. 14A and 14B, in the comparative example, the control signal CLA may have a delay of approximately 85.56 ns at an edge and the center of the main line ML. As compared with this, in the embodiment of the disclosure, the control signal CLA may have a delay of approximately 7.6 ns at the edge and the center of the main line ML. For example, in the disclosure, delays of the control signals CLA, CLB, and CLC may be minimized, and accordingly, the diver 170 may be stably driven.

FIGS. 15 to 18 are schematic diagrams illustrating electronic devices in accordance with various embodiments of the disclosure.

Figure 15:
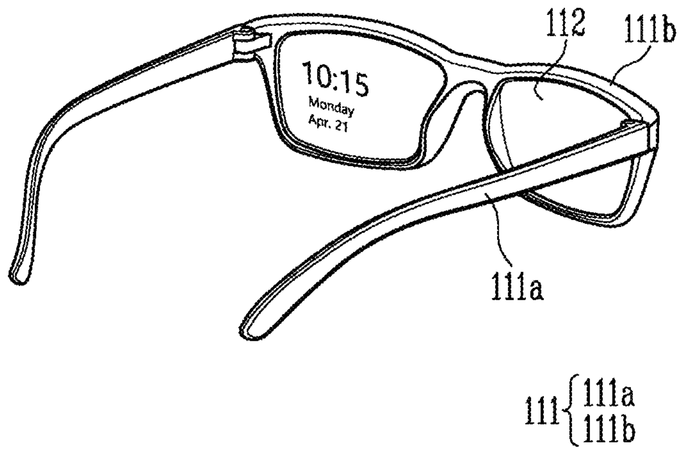
FIGS. 15 to 18 are schematic diagrams illustrating electronic devices in accordance with various embodiments of the disclosure.

Referring to FIG. 15, the display device 100*a* in accordance with an embodiment of the disclosure may be applied to smart glasses. The smart glasses may include a frame 111 and a lens part 112. The smart glasses may be a wearable electronic device which can be worn on the face of a user, and may have a structure in which a portion of the frame 111 may be folded or unfolded. For example, the smart glasses may be a wearable device for Augmented Reality (AR).

The frame 111 may include a housing 111*b* supporting the lens part 112 and a leg part 111*a* for allowing the user to wear the smart glasses. The leg part 111*a* may be connected to the housing 111 by a hinge to be folded or unfolded.

A battery, a touch pad, a microphone, and/or a camera may be built in the frame 111. A projector for outputting light and/or a processor for controlling a light signal may be built in the frame 111.

The lens part 112 may be an optical member which allows light to be transmitted therethrough or allows light to be reflected thereby. The lens part 112 may include glass and/or transparent synthetic resin.

The display device 100*a* in accordance with an embodiment of the disclosure may be applied to the lens part 112. In an embodiment, the user may recognize an image displayed by a light signal transmitted from the projector of the frame 111 through the lens part 112. For example, the user may recognize information including time, data, and the like, which are displayed on the lens part 112.

Figure 16:
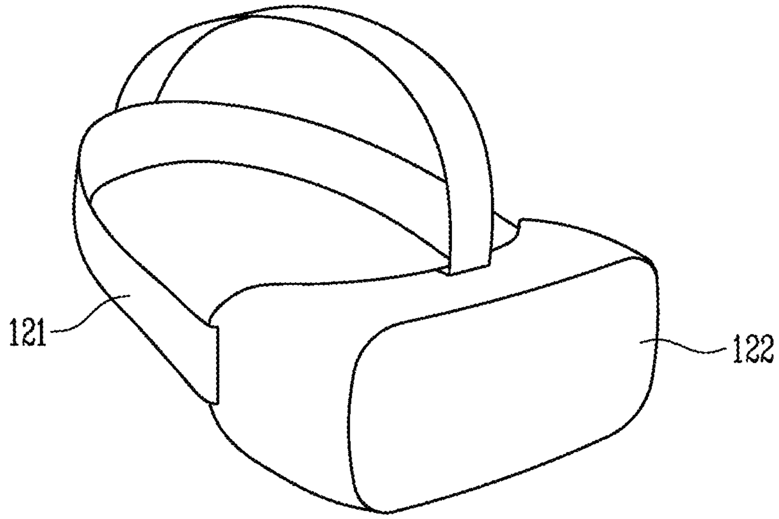

Referring to FIG. 16, the display device 100*a* in accordance with an embodiment of the disclosure may be applied to a Head Mounted Display (HMD). The HMD may include a head mounted band 121 and a display accommodating case 122. For example, the HMD may be a wearable electronic device which can be worn on the head of a user.

The head mounted band 121 may be connected to the display accommodating case 122, to fix the display accommodating case 122. The head mounted band 121 may include a horizontal band and a vertical band to fix the HMD to the head of the user. The horizontal band may be provided to surround a side portion of the head of the user, and the vertical band may be provided to surround a top portion of the head of the user. However, the disclosure is not necessarily limited thereto, and the head mounted band 121 may be implemented in the shape of a glasses frame or a helmet.

The display accommodating case 122 may accommodate the display device, and may include at least one lens. The at least one lens may provide an image to the user. For example, the display device 100*a* in accordance with an embodiment of the disclosure may be applied to a left-eye lens and a right-eye lens, which are implemented in the display accommodating case 122.

Figure 17:
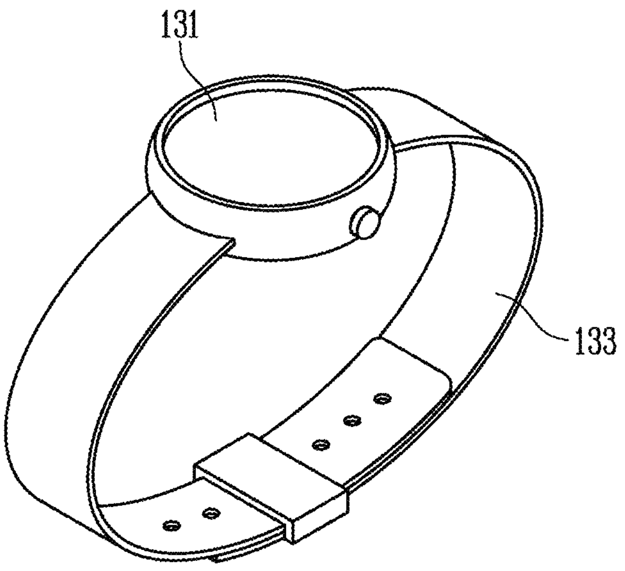

Referring to FIG. 17, the display device 100*a* in accordance with an embodiment of the disclosure may be applied to a smart watch. The smart watch may include a display part 131 and a strap part 133. The smart watch may be a wearable electronic device, and may be mounted on a wrist of a user. The display device 100*a* in accordance with an embodiment of the disclosure may be applied to the display part 131. For example, the display part 131 may provide image data including information such as time and data.

Figure 18:
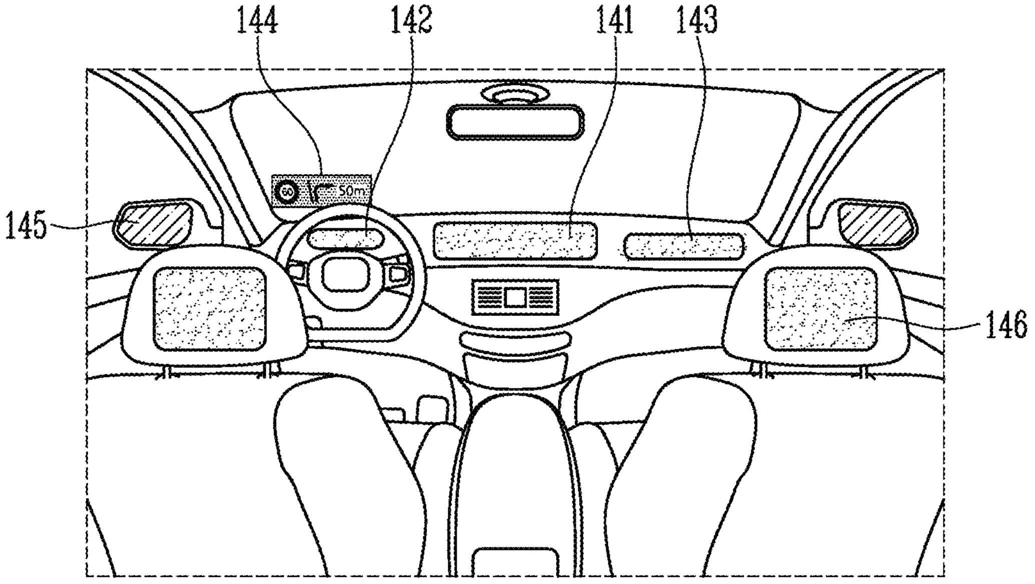

Referring to FIG. 18, the display device 100*a* in accordance with an embodiment of the disclosure may be applied to an automotive display. In an embodiment, the automotive display may be an electronic device provided at the inside/outside of a vehicle to provide image data.

For example, the display device 100*a* in accordance with an embodiment of the disclosure may be applied to at least one of an infortainment panel 141, a cluster 142, a co-driver display 143, a head-up display 144, a side mirror display 145, and a read seat display 146, which are provided in the vehicle.

Figure 19:
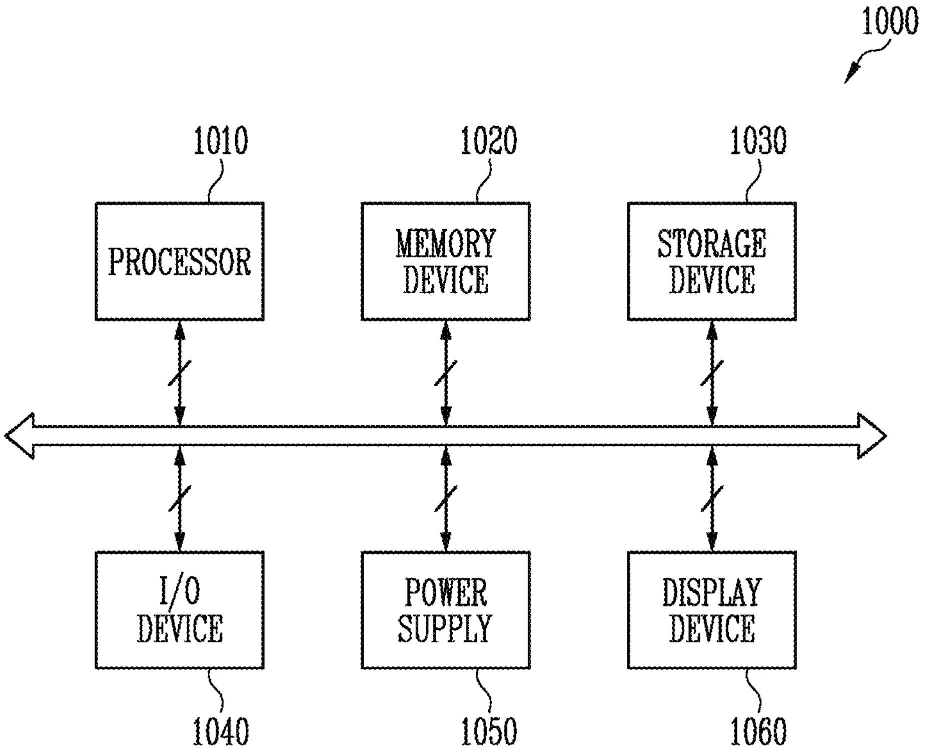
FIG. 19 is a schematic block diagram illustrating an electronic device including a display device in accordance with an embodiment.

FIG. 19 is a schematic block diagram illustrating an electronic device 1000 including a display device in accordance with an embodiment.

Referring to FIGS. 19, the electronic device 1000 may include a processor 1010, a memory device 1020, a storage device 1030, an input/output (I/O) device 1040, a power supply 1050, and a display device 1060. The display device 1060 may be the display device 100 of FIG. 1. The electronic device 1000 may further include various ports for communication with a video card, a sound card, a memory card, a USB device, or other systems.

For example, the electronic device 1000 may be a cellular phone, a video phone, a smart pad, a smartwatch, a navigation device for vehicles, a computer monitor, a laptop computer, a head-mounted display device, or the like.

The processor 1010 may perform specific calculations or tasks. In an embodiment, the processor 1010 may include at least one of a central processing unit, an application processor, a graphic processing unit, a communication processor, an image signal processor, a controller, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to image data signals and/or control signals from the processor 1010. The display device 1060 may be connected to other components through the buses or other communication links.

In the display device and the method of driving the same in accordance with the disclosure, a data signal may be supplied to a pixel, using coupling of a capacitor, and accordingly, a voltage range of the data signal may be sufficiently secured, so that the pixel may be applied to a high resolution panel.

In the display device and the method of driving the same in accordance with the disclosure, pixels on at least two horizontal lines may be simultaneously initialized (and threshold voltage compensation) using a demux, and thus a stable driving time may be secured.

In the display device and the method of driving the same in accordance with the disclosure, at least one control signal for controlling a demux may be supplied to a main line, and may be supplied to the demux, using a sub-buffer connected to a branch line branching off from the main line. Thus, a delay of the control may be minimized.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:

a data driver that supplies a reference voltage and a plurality of data signals to each of output lines;

a divider including demultiplexers that supplies the reference voltage and the plurality of data signals, which are supplied from the each of the output lines, to a plurality of data lines, in response to control signals;

a timing controller that supplies the control signals; and pixels connected to scan lines and the plurality of data lines, wherein the pixels located on at least two different horizontal lines are simultaneously supplied with the reference voltage.

2. The display device of claim 1, wherein each of the pixels is divisionally driven in an initialization period, a threshold voltage compensation period, and a data writing period, and the pixels are supplied with the reference voltage during the initialization period and the threshold voltage compensation period.

3. The display device of claim 2, wherein the initialization period and the threshold voltage compensation period of the pixels located on the at least two different horizontal lines overlap with each other.

4. The display device of claim 2, wherein the data writing period of the pixels located on the at least two different horizontal lines do not overlap with each other.

5. The display device of claim 2, wherein each of the demultiplexers includes switches, each connected to one of the plurality of data lines and turned on or turned off in response to the control signals, the data driver supplies the reference voltage to the output lines during the initialization period and the threshold voltage compensation period, and the timing controller simultaneously supplies the control signals such that the switches are simultaneously turned on during the initialization period and the threshold voltage compensation period.

6. The display device of claim 5, wherein the data driver sequentially supplies the plurality of data signals to each of the output lines during the data writing period, and the timing controller sequentially supplies the control signals such that the switches are sequentially turned on during the data writing period.

7. The display device of claim 6, wherein each of the demultiplexers is connected to the plurality of data lines, and each of the plurality of data lines is connected to the pixels emitting lights of different colors.

8. The display device of claim 6, wherein each of the demultiplexers is connected to the plurality of data lines, and each of the plurality of data lines is connected to the pixels emitting light of a same color.

9. The display device of claim 2, wherein a channel of the data driver includes:

a first decoder that generates the plurality of data signals;

a second decoder that generates the reference voltage;

a first switch connected between a source amplifier and the first decoder; and a second switch connected between the source amplifier and the second decoder, and an output terminal of the source amplifier is connected to one of the output lines.

10. The display device of claim 9, wherein the first switch is turned on during the data writing period, corresponding to a voltage control signal supplied from the timing controller, and the second switch is turned on during the initialization period and the threshold voltage compensation period, corresponding to the voltage control signal.

11. The display device of claim 1, further comprising:

a main line located between the timing controller and the divider;

main buffers disposed at a side and another side of the main line, the main buffers supplying, to the main line, at least one of the control signals supplied from the timing controller;

branch lines branching off from the main line; and a sub-buffer located on each of the branch lines, the sub-buffer being connected to at least one of the demultiplexers.

12. The display device of claim 1, wherein each of the pixels includes:

a first transistor including a gate electrode connected to a first node, a first electrode connected to a first power line, and a second electrode connected to a second node;

a second transistor including a first electrode connected to one of the plurality of data lines and a gate electrode connected to a first scan line;

a third transistor connected between the first node and the second node, the third transistor including a gate electrode connected to a second scan line;

a light emitting element including an anode electrode and a cathode electrode, the cathode electrode connected to a second power line;

a fourth transistor connected between the anode electrode of the light emitting element and the second node, the fourth transistor including a gate electrode connected to a first emission control line;

a fifth transistor connected between the anode electrode of the light emitting element and a third power line, the fifth transistor including a gate electrode connected to a third scan line;

a sixth transistor connected between the first electrode of the first transistor and the first power line, the sixth transistor including a gate electrode connected to a second emission control line;

a first capacitor connected between a second electrode of the second transistor and the first node; and a second capacitor connected between the first power line and the first node.

13. A method of driving a display device, the method comprising:

supplying a reference voltage and a plurality of data signals to an output line;

supplying the reference voltage and the plurality of data signals to a plurality of data lines, using a demultiplexer connected to the output line; and supplying the reference voltage to pixels during a first period in which the pixels are initialized and a second period in which a threshold voltage of a driving transistor included in each of the pixels is compensated, wherein the pixels located on at least two different horizontal lines are simultaneously supplied with the reference voltage during the first period and the second period.

14. The method of claim 13, wherein the demultiplexer includes a plurality of switches, and each of the plurality of switches is connected to one of the plurality of data lines, and the plurality of switches are set to be in a turn-on state during the first period and the second period.

15. The method of claim 14, wherein the pixels are supplied with the plurality of data signals during a third period, and the third periods of the pixels located on the at least two different horizontal lines do not overlap with each other.

16. The method of claim 15, wherein the plurality of switches are sequentially turned on such that turn-on periods of the plurality of switches do not overlap with each other during the third period.

17. The method of claim 15, further comprising:

supplying, to a main line, at least one control signal for controlling turning-on and turning-off of the plurality of switches via a main buffer located at each of a side and another side of the main line; and supplying the at least one control signal to the demultiplexer via a sub-buffer connected to a branch line branching off from the main line.

18. The method of claim 14, wherein each of the plurality of data lines connected to the demultiplexer is connected to the pixels emitting lights of different colors.

19. The method of claim 14, wherein each of the plurality of data lines connected to the demultiplexer is connected to the pixels emitting light of a same color.

20. The method of claim 13, wherein the reference voltage and the plurality of data signals are supplied to the output line via a same source amplifier.

21. An electronic device, comprising:

a processor to provide input image data;

a display device to display an image based on the input image data, wherein the display device comprises:

a data driver that supplies a reference voltage and a plurality of data signals to each of output lines;

a divider including demultiplexers that supplies the reference voltage and the plurality of data signals, which are supplied from the each of the output lines, to a plurality of data lines, corresponding to control signals;

a timing controller that supplies the control signals; and pixels connected to scan lines and the plurality of data lines, wherein the pixels located on at least two different horizontal lines are simultaneously supplied with the reference voltage.

* * * * *